US006927394B2

(12) United States Patent
Parham et al.

(10) Patent No.: US 6,927,394 B2
(45) Date of Patent: Aug. 9, 2005

(54) FIRE DETECTOR WITH ELECTRONIC FREQUENCY ANALYSIS

(75) Inventors: Owen D. Parham, La Habra, CA (US); David A. Castleman, Fresno, CA (US)

(73) Assignee: Fire Sentry Corporation, Brea, CA (US)

( * ) Notice: Subject to any disclaimer, the term of this patent is extended or adjusted under 35 U.S.C. 154(b) by 91 days.

(21) Appl. No.: 10/341,756

(22) Filed: Jan. 13, 2003

(65) Prior Publication Data

US 2003/0178568 A1 Sep. 25, 2003

Related U.S. Application Data

(63) Continuation of application No. 09/649,147, filed on Aug. 25, 2000, now Pat. No. 6,507,023, which is a continuation-in-part of application No. 08/866,023, filed as application No. PCT/US97/03327 on Feb. 28, 1997, now Pat. No. 6,153,881, which is a continuation-in-part of application No. 08/690,067, filed on Jul. 31, 1996, now Pat. No. 6,046,452, which is a continuation-in-part of application No. 08/609,740, filed on Mar. 1, 1996, now Pat. No. 5,773,826.

(60) Provisional application No. 60/151,190, filed on Aug. 27, 1999.

(51) Int. Cl.[7] .................................................. G01J 5/02

(52) U.S. Cl. .................................. 250/339.15; 250/342

(58) Field of Search ....................... 250/339.15, 339.05, 250/339.14, 342; 340/578

(56) References Cited

U.S. PATENT DOCUMENTS

| | | | | |
|---|---|---|---|---|
| 4,101,767 | A | 7/1978 | Lennington et al. | 250/339 |
| 4,220,857 | A | 9/1980 | Bright | 250/339 |
| 4,223,678 | A | 9/1980 | Langer et al. | 128/419 |
| 4,455,487 | A | 6/1984 | Wendt | 250/339 |
| 4,533,834 | A | 8/1985 | McCormack | 250/554 |
| 4,603,255 | A | 7/1986 | Henry et al. | 250/339 |

(Continued)

FOREIGN PATENT DOCUMENTS

| | | | |
|---|---|---|---|
| EP | 0 159 798 | A1 | 7/1978 |
| EP | 0 175 032 | A1 | 3/1986 |
| EP | 0 618 555 | A2 | 10/1994 |
| GB | 2 012 092 | A | 7/1979 |
| GB | 2 188 416 | A | 9/1987 |
| WO | WO 98/05014 | | 2/1998 |

OTHER PUBLICATIONS

Bjorklund, F.B. et al., "Fire Loss Reduction—Part I We've Only Scratched the Surface!," "Fire Loss Reduction, Part II—Technology Holds the Key!," reprint from AID magazine (a publication of the National Alarm Association of America), Mar. 1986.

"Optical Fire Sensors State–of–the–Art," technical brochure of Fire Sentry Corporation, 1989–90.

*Primary Examiner*—Georgia Epps
*Assistant Examiner*—Richard Hanig
(74) *Attorney, Agent, or Firm*—Irell & Manella LLP

(57) ABSTRACT

A process and system for flame detection includes a microprocessor-controlled detector with a first sensor for sensing temporal energy in a first optical frequency range, and a second sensor for sensing temporal energy in a second optical frequency range. The temporal energy sensed in the respective first and second optical frequency ranges are transformed into respective first and second spectra of frequency components. A compensated spectrum of frequency components is generated by performing a frequency bin subtraction of the first and second spectra of frequency components. The compensated spectrum represents the energy emitted from the environment with energy emitted from false alarm sources. An average amplitude and centroid of the compensated spectrum are obtained and used to determine if a monitored phenomenon represents an unwanted fire situation. The compensated spectrum can be compared to reference compensated spectra of frequency components generated from known unwanted fire sources and known false alarm sources.

16 Claims, 17 Drawing Sheets

U.S. PATENT DOCUMENTS

| | | | | | |
|---|---|---|---|---|---|
| 4,665,390 | A | | 5/1987 | Kern et al. | 340/587 |
| 4,691,196 | A | | 9/1987 | Kern et al. | 340/578 |
| 4,701,624 | A | | 10/1987 | Kern et al. | 250/554 |
| 4,742,236 | A | | 5/1988 | Kawakami et al. | 250/554 |
| 4,750,197 | A | | 6/1988 | Denekamp et al. | 379/58 |
| 4,769,775 | A | | 9/1988 | Kern et al. | 364/551.01 |
| 4,866,420 | A | * | 9/1989 | Meyer, Jr. | 340/578 |
| 4,983,853 | A | | 1/1991 | Davall et al. | 250/554 |
| 5,107,128 | A | | 4/1992 | Davall et al. | 250/554 |
| 5,153,722 | A | | 10/1992 | Goedeke et al. | 358/108 |
| 5,155,468 | A | | 10/1992 | Stanley et al. | 340/501 |
| 5,311,167 | A | | 5/1994 | Plimpton et al. | 340/578 |
| 5,548,276 | A | | 8/1996 | Thomas | 340/578 |
| 5,594,421 | A | | 1/1997 | Thuillard | 340/578 |
| 5,598,099 | A | | 1/1997 | Castleman et al. | 324/456 |
| 5,773,826 | A | | 6/1998 | Castleman et al. | 250/339.15 |
| 5,937,077 | A | * | 8/1999 | Chan et al. | 382/100 |
| 5,995,008 | A | | 11/1999 | King et al. | 340/578 |
| 6,150,659 | A | * | 11/2000 | Baliga et al. | 250/339.15 |
| 6,184,792 | B1 | | 2/2001 | Privalov et al. | 340/578 |

* cited by examiner

| FIG. 4A |
|---|
| FIG. 4B |

FIG. 4A

| TEMPERATURE OF FIRE/FLAME IN DEGREES K (KELVIN) | TEMPERATURE OF FIRE/FLAME IN DEGREES K (CELSIUS) | TOTAL RADIANT ENERGY (WATTS/CM$^2$) | VB + NBIR + WBIR RADIANT ENERGY FROM 0.4 TO 3.5 MICRONS (W/CM$^2$) | NARROW BAND IR RADIANT ENERGY 4.3 MICRONS (WATTS/CM$^2$) | VB + NBIR + WBIR PERCENTAGE OF 0.4 TO 3.5 MICRON ENERGY | NARROW BAND IR PERCENTAGE 4.3 MICRON ENERGY | VB + NBIR + WBIR VS. NARROW BAND IR TIMES MORE ENERGY |
|---|---|---|---|---|---|---|---|
| 1020 | 746.85 | 6.136 | 2.439 | 0.199 | 39.75 | 3.24 | 12.26 |
| 1040 | 766.85 | 6.632 | 2.731 | 0.213 | 41.18 | 3.20 | 12.85 |
| 1060 | 786.85 | 7.157 | 3.047 | 0.226 | 42.58 | 3.16 | 13.46 |
| 1080 | 806.85 | 7.713 | 3.390 | 0.241 | 43.95 | 3.12 | 14.09 |
| 1100 | 826.85 | 8.300 | 3.760 | 0.255 | 45.30 | 3.08 | 14.73 |
| 1120 | 846.85 | 8.920 | 4.158 | 0.270 | 46.62 | 3.03 | 15.39 |
| 1140 | 866.85 | 9.575 | 4.587 | 0.286 | 47.91 | 2.98 | 16.06 |
| 1160 | 886.85 | 10.26 | 5.047 | 0.301 | 49.17 | 2.94 | 16.75 |
| 1180 | 906.85 | 10.99 | 5.539 | 0.317 | 50.40 | 2.89 | 17.45 |
| 1200 | 926.85 | 11.76 | 6.066 | 0.334 | 51.60 | 2.84 | 18.17 |
| 1220 | 946.85 | 12.56 | 6.628 | 0.351 | 52.78 | 2.79 | 18.91 |
| 1240 | 966.85 | 13.40 | 7.227 | 0.368 | 53.92 | 2.74 | 19.66 |
| 1260 | 986.85 | 14.29 | 7.864 | 0.385 | 55.04 | 2.69 | 20.44 |
| 1280 | 1006.85 | 15.22 | 8.541 | 0.402 | 56.13 | 2.64 | 21.23 |
| 1300 | 1026.85 | 16.19 | 9.26 | 0.420 | 57.19 | 2.60 | 22.03 |
| 1320 | 1046.85 | 17.21 | 10.02 | 0.439 | 58.22 | 2.55 | 22.86 |
| 1340 | 1066.85 | 18.28 | 10.83 | 0.457 | 59.23 | 2.50 | 23.69 |
| 1360 | 1086.85 | 19.39 | 11.68 | 0.476 | 60.21 | 2.45 | 24.56 |
| 1380 | 1106.85 | 20.56 | 12.58 | 0.495 | 61.16 | 2.41 | 25.43 |
| 1400 | 1126.85 | 21.78 | 13.52 | 0.514 | 62.09 | 2.36 | 26.32 |
| 1420 | 1146.85 | 23.05 | 14.52 | 0.533 | 62.99 | 2.31 | 27.23 |
| 1440 | 1166.85 | 24.38 | 15.57 | 0.553 | 63.87 | 2.27 | 28.16 |
| 1460 | 1186.85 | 25.76 | 16.67 | 0.573 | 64.73 | 2.22 | 29.12 |
| 1480 | 1206.85 | 27.20 | 17.83 | 0.593 | 65.56 | 2.18 | 30.07 |
| 1500 | 1226.85 | 28.70 | 19.05 | 0.613 | 66.37 | 2.14 | 31.06 |
| 1520 | 1246.85 | 30.26 | 20.32 | 0.634 | 67.16 | 2.09 | 32.07 |
| 1540 | 1266.85 | 31.89 | 21.66 | 0.655 | 67.93 | 2.05 | 33.09 |
| 1560 | 1286.85 | 33.58 | 23.06 | 0.676 | 68.67 | 2.01 | 34.13 |
| 1580 | 1306.85 | 35.33 | 24.52 | 0.697 | 69.40 | 1.97 | 35.19 |
| 1600 | 1326.85 | 37.15 | 26.05 | 0.718 | 70.10 | 1.93 | 36.28 |
| 1620 | 1346.85 | 39.05 | 27.64 | 0.739 | 70.79 | 1.89 | 37.38 |
| 1640 | 1366.85 | 41.01 | 29.31 | 0.761 | 71.46 | 1.86 | 38.50 |

| | | | | | | | |
|---|---|---|---|---|---|---|---|
| 1660 | 1386.85 | 43.05 | 31.04 | 0.783 | 72.10 | 1.82 | 39.64 |
| 1680 | 1406.85 | 45.16 | 32.85 | 0.805 | 72.74 | 1.78 | 40.80 |
| 1700 | 1426.85 | 47.35 | 34.73 | 0.827 | 73.35 | 1.75 | 41.99 |
| 1720 | 1446.85 | 49.62 | 36.69 | 0.850 | 73.95 | 1.71 | 43.20 |
| 1740 | 1466.85 | 51.97 | 38.73 | 0.872 | 74.53 | 1.68 | 44.42 |
| 1760 | 1486.85 | 54.40 | 40.85 | 0.895 | 75.09 | 1.65 | 45.65 |
| 1780 | 1506.85 | 56.91 | 43.05 | 0.918 | 75.64 | 1.61 | 46.92 |
| 1800 | 1526.85 | 59.52 | 45.34 | 0.941 | 76.18 | 1.58 | 48.22 |
| 1820 | 1546.85 | 62.21 | 47.71 | 0.964 | 76.70 | 1.55 | 49.52 |
| 1840 | 1566.85 | 64.99 | 50.17 | 0.987 | 77.21 | 1.52 | 50.83 |
| 1860 | 1586.85 | 67.86 | 52.73 | 1.010 | 77.70 | 1.49 | 52.18 |
| 1880 | 1606.85 | 70.82 | 55.37 | 1.034 | 78.18 | 1.46 | 53.55 |
| 1900 | 1626.85 | 73.89 | 58.11 | 1.057 | 78.65 | 1.43 | 54.96 |
| 1920 | 1646.85 | 77.05 | 60.95 | 1.081 | 79.10 | 1.40 | 56.38 |
| 1940 | 1666.85 | 80.31 | 63.88 | 1.105 | 79.55 | 1.38 | 57.81 |
| 1960 | 1686.85 | 83.67 | 66.92 | 1.129 | 79.98 | 1.35 | 59.29 |
| 1980 | 1706.85 | 87.14 | 70.06 | 1.153 | 80.40 | 1.32 | 60.77 |
| 2000 | 1726.85 | 90.71 | 73.30 | 1.177 | 80.81 | 1.30 | 62.26 |
| 2020 | 1746.85 | 94.40 | 76.65 | 1.201 | 81.20 | 1.27 | 63.79 |
| 2040 | 1766.85 | 98.19 | 80.11 | 1.226 | 81.59 | 1.25 | 65.32 |
| 2060 | 1786.85 | 102.1 | 83.69 | 1.250 | 81.97 | 1.23 | 66.91 |
| 2080 | 1806.85 | 106.1 | 87.38 | 1.275 | 82.34 | 1.20 | 68.50 |
| 2100 | 1826.85 | 110.3 | 91.18 | 1.300 | 82.69 | 1.18 | 70.14 |
| 2120 | 1846.85 | 114.5 | 95.10 | 1.325 | 83.04 | 1.16 | 71.77 |
| 2140 | 1866.85 | 118.9 | 99.15 | 1.349 | 83.38 | 1.14 | 73.46 |
| 2160 | 1886.85 | 123.4 | 103.3 | 1.374 | 83.72 | 1.11 | 75.15 |
| 2180 | 1906.85 | 128.0 | 107.6 | 1.400 | 84.04 | 1.09 | 76.89 |
| 2200 | 1926.85 | 132.8 | 112.0 | 1.425 | 84.35 | 1.07 | 78.61 |
| 2220 | 1946.85 | 137.7 | 116.6 | 1.450 | 84.66 | 1.05 | 80.40 |
| 2240 | 1966.85 | 142.7 | 121.3 | 1.475 | 84.96 | 1.03 | 82.17 |
| 2260 | 1986.85 | 147.9 | 126.1 | 1.501 | 85.25 | 1.02 | 83.99 |
| 2280 | 2006.85 | 153.2 | 131.0 | 1.526 | 85.53 | 1.00 | 85.86 |

FIG. 4B

FIG. 5A

FIG. 5B

FIG. 5A

| TEMPERATURE OF FIRE/FLAME IN DEGREES K (KELVIN) | TEMPERATURE OF FIRE/FLAME IN DEGREES K (CELSIUS) | TOTAL RADIANT ENERGY (WATTS/CM$^2$) | VB + NBIR + WBIR RADIANT ENERGY FROM 0.4 TO 3.5 MICRONS (W/CM$^2$) | NARROW BAND IR RADIANT ENERGY 4.3 MICRONS (WATTS/CM$^2$) | VB + NBIR + WBIR PERCENTAGE OF 0.4 TO 3.5 MICRON ENERGY | NARROW BAND IR PERCENTAGE 4.3 MICRON ENERGY | VB + NBIR + WBIR VS. NARROW BAND IR TIMES MORE ENERGY |
|---|---|---|---|---|---|---|---|
| 2300 | 2026.85 | 158.7 | 136.1 | 1.552 | 85.81 | 0.98 | 87.73 |
| 2320 | 2046.85 | 164.2 | 141.4 | 1.578 | 86.08 | 0.96 | 89.62 |
| 2340 | 2066.85 | 170.0 | 146.8 | 1.603 | 86.35 | 0.94 | 91.55 |
| 2360 | 2086.85 | 175.9 | 152.3 | 1.629 | 86.60 | 0.93 | 93.49 |
| 2380 | 2106.85 | 181.9 | 158.0 | 1.655 | 86.85 | 0.91 | 95.46 |
| 2400 | 2126.85 | 188.1 | 163.8 | 1.681 | 87.10 | 0.89 | 97.47 |
| 2420 | 2146.85 | 194.5 | 169.8 | 1.707 | 87.33 | 0.88 | 99.49 |
| 2440 | 2166.85 | 201.0 | 176.0 | 1.733 | 87.57 | 0.86 | 101.54 |
| 2460 | 2186.85 | 207.6 | 182.3 | 1.759 | 87.79 | 0.85 | 103.61 |
| 2480 | 2206.85 | 214.5 | 188.8 | 1.785 | 88.01 | 0.83 | 105.72 |
| 2500 | 2226.85 | 221.5 | 195.4 | 1.812 | 88.23 | 0.82 | 107.86 |
| 2520 | 2246.85 | 228.6 | 202.2 | 1.838 | 88.44 | 0.80 | 110.01 |
| 2540 | 2266.85 | 236.0 | 209.2 | 1.864 | 88.64 | 0.79 | 112.20 |
| 2560 | 2286.85 | 243.5 | 216.3 | 1.891 | 88.84 | 0.78 | 114.41 |
| 2580 | 2306.85 | 251.2 | 223.7 | 1.917 | 89.04 | 0.76 | 116.65 |
| 2600 | 2326.85 | 259.1 | 231.2 | 1.944 | 89.23 | 0.75 | 118.93 |
| 2620 | 2346.85 | 267.1 | 238.9 | 1.971 | 89.41 | 0.74 | 121.22 |
| 2640 | 2366.85 | 275.4 | 246.7 | 1.997 | 89.59 | 0.73 | 123.54 |
| 2660 | 2386.85 | 283.8 | 254.8 | 2.024 | 89.77 | 0.71 | 125.90 |
| 2680 | 2406.85 | 292.5 | 263.1 | 2.051 | 89.94 | 0.70 | 128.27 |
| 2700 | 2426.85 | 301.3 | 271.5 | 2.078 | 90.11 | 0.69 | 130.69 |
| 2720 | 2446.85 | 310.3 | 280.1 | 2.104 | 90.27 | 0.68 | 133.12 |
| 2740 | 2466.85 | 319.6 | 289.0 | 2.131 | 90.43 | 0.67 | 135.58 |
| 2760 | 2486.85 | 329.0 | 298.0 | 2.158 | 90.58 | 0.66 | 138.08 |
| 2780 | 2506.85 | 338.6 | 307.3 | 2.185 | 90.74 | 0.65 | 140.62 |
| 2800 | 2526.85 | 348.5 | 316.7 | 2.212 | 90.88 | 0.63 | 143.14 |
| 2820 | 2546.85 | 358.5 | 326.4 | 2.240 | 91.03 | 0.62 | 145.74 |
| 2840 | 2566.85 | 368.8 | 336.2 | 2.267 | 91.17 | 0.61 | 148.34 |
| 2860 | 2586.85 | 379.3 | 346.3 | 2.294 | 91.30 | 0.60 | 150.98 |
| 2880 | 2606.85 | 390.0 | 356.6 | 2.321 | 91.43 | 0.60 | 153.64 |
| 2900 | 2626.85 | 401.0 | 367.2 | 2.348 | 91.56 | 0.59 | 156.35 |
| 2920 | 2646.85 | 412.2 | 377.9 | 2.376 | 91.69 | 0.58 | 159.07 |

| | | | | | | | |
|---|---|---|---|---|---|---|---|
| 2940 | 2666.85 | 423.6 | 388.9 | 2.403 | 91.81 | 0.57 | 161.84 |
| 2960 | 2686.85 | 435.2 | 400.1 | 2.431 | 91.93 | 0.56 | 164.63 |
| 2980 | 2706.85 | 447.1 | 411.5 | 2.458 | 92.04 | 0.55 | 167.44 |
| 3000 | 2726.85 | 459.2 | 423.2 | 2.485 | 92.15 | 0.54 | 170.27 |
| 3020 | 2746.85 | 471.6 | 435.1 | 2.513 | 92.26 | 0.53 | 173.13 |
| 3040 | 2766.85 | 484.2 | 447.3 | 2.541 | 92.37 | 0.52 | 176.04 |
| 3060 | 2786.85 | 497.1 | 459.7 | 2.568 | 92.47 | 0.52 | 179.00 |
| 3080 | 2806.85 | 510.2 | 472.3 | 2.596 | 92.57 | 0.51 | 181.94 |
| 3100 | 2826.85 | 523.6 | 485.2 | 2.623 | 92.66 | 0.50 | 184.95 |
| 3120 | 2846.85 | 537.2 | 498.3 | 2.651 | 92.76 | 0.49 | 187.96 |
| 3140 | 2866.85 | 551.1 | 511.7 | 2.679 | 92.85 | 0.49 | 191.01 |
| 3160 | 2886.85 | 565.3 | 525.4 | 2.707 | 92.93 | 0.48 | 194.09 |
| 3180 | 2906.85 | 579.8 | 539.3 | 2.734 | 93.02 | 0.47 | 197.24 |
| 3200 | 2926.85 | 594.5 | 553.5 | 2.762 | 93.10 | 0.46 | 200.39 |
| 3220 | 2946.85 | 609.5 | 567.9 | 2.790 | 93.18 | 0.46 | 203.54 |
| 3240 | 2966.85 | 624.8 | 582.6 | 2.818 | 93.26 | 0.45 | 206.78 |
| 3260 | 2986.85 | 640.4 | 597.6 | 2.846 | 93.33 | 0.44 | 210.01 |
| 3280 | 3006.85 | 656.2 | 612.9 | 2.874 | 93.40 | 0.44 | 213.29 |
| 3300 | 3026.85 | 672.4 | 628.4 | 2.902 | 93.47 | 0.43 | 216.57 |
| 3320 | 3046.85 | 688.8 | 644.3 | 2.930 | 93.53 | 0.43 | 219.92 |
| 3340 | 3066.85 | 705.6 | 660.4 | 2.958 | 93.59 | 0.42 | 223.26 |
| 3360 | 3086.85 | 722.6 | 676.8 | 2.986 | 93.65 | 0.41 | 226.65 |
| 3380 | 3106.85 | 740.0 | 693.4 | 3.014 | 93.71 | 0.41 | 230.08 |
| 3400 | 3126.85 | 757.6 | 710.4 | 3.042 | 93.77 | 0.40 | 233.55 |
| 3420 | 3146.85 | 775.6 | 727.7 | 3.070 | 93.82 | 0.40 | 237.04 |
| 3440 | 3166.85 | 793.9 | 745.3 | 3.099 | 93.87 | 0.39 | 240.51 |
| 3460 | 3186.85 | 812.6 | 763.1 | 3.127 | 93.92 | 0.38 | 244.07 |
| 3480 | 3206.85 | 831.5 | 781.3 | 3.155 | 93.96 | 0.38 | 247.65 |
| 3500 | 3226.85 | 850.8 | 799.8 | 3.183 | 94.00 | 0.37 | 251.27 |
| 3520 | 3246.85 | 870.4 | 818.6 | 3.211 | 94.04 | 0.37 | 254.85 |
| 3540 | 3266.85 | 890.4 | 837.7 | 3.240 | 94.08 | 0.36 | 258.53 |
| 3560 | 3286.85 | 910.6 | 857.1 | 3.268 | 94.12 | 0.36 | 262.25 |

*FIG. 5B*

FIRE DETECTOR WITH ELECTRONIC FREQUENCY ANALYSIS

CROSS REFERENCE TO RELATED APPLICATIONS

This application is a continuation application of U.S. application Ser. No. 09/649,147, filed on Aug. 25, 2000, now U.S. Pat. No. 6,507,023 presently allowed, which claims priority to U.S. Provisional Application Ser. No. 60/151,190, filed on Aug. 27, 1999, now expired, and which is also a continuation-in-part of U.S. application Ser. No. 08/866,023, filed May 30, 1997, now U.S. Pat. No. 6,153,881, which is a national stage of PCT/US 97/03327, filed on Feb 28, 1997, which is a continuation-in-part of U.S. application Ser. No. 08/690,067 filed Jul. 31, 1996, now U.S. Pat. No. 6,046,452, which is a continuation-in-part of U.S. application Ser. No. 08/609,740, filed on Mar. 1, 1996, now U.S. Pat. No. 5,773,826. Each of the foregoing applications is hereby incorporated by reference as if set forth fully herein.

FIELD OF THE INVENTION

The field of the present invention pertains to apparatus and methods for detecting sparks, flames or fire. More particularly, the invention relates to a process and system for detecting a spark, flame or fire with increased sensitivity, faster processing and response times, and greater intelligence for discriminating against false alarms.

BACKGROUND

To prevent fires, and the resulting loss of life and property, the use of flame detectors or flame detection systems is not only voluntarily adopted in many situations, but is also required by the appropriate authority for implementing the National Fire Protection Association's (NFPA) codes, standards, and regulations. Facilities faced with a constant threat of fire, such as petrochemical facilities and refineries, semiconductor fabrication plants, paint facilities, co-generation plants, aircraft hangers, silane gas storage facilities, gas turbines and power plants, gas compressor stations, munitions plants, airbag manufacturing plants, and so on are examples of environments that typically require constant monitoring and response to fires and potential fire hazard situations.

To convey the significance of the fire detection system and process proposed by this patent application, an exemplary environment, in which electrostatic coating or spraying operations are performed, is explained in some detail. However, it should be understood that the present invention may be practiced in any environment faced with a threat of fire.

Electrostatic coating or spraying is a popular technique for large-scale application of paint, as for example, in a production painting line for automobiles and large appliances. Electrostatic coating or spraying involves the movement of very small droplets of electrically charged "liquid" paint or particles of electrically charged "Powder" paint from an electrically charged (40 to 120,000 volts) nozzle to the surface of a part to be coated.

While facilitating efficiency, environmental benefits, and many production advantages, electrostatic coating of parts in a production paint line, presents an environment fraught with fire hazards and safety concerns. For example, sparks are common from improperly grounded workpieces or faulty spray guns. In instances where the coating material is a paint having a volatile solvent, the danger of a fire from sparking, or arcing, is, in fact, quite serious. Fires are also a possibility if electrical arcs occur between charged objects and a grounded conductor in the vicinity of flammable vapors.

Flame detectors have routinely been located at strategic positions in spray booths to monitor any fires that may occur and to shut down the electrostatics, paint flow to the gun, and conveyors in order to cut off the contributing factors leading to the fire.

Three primary contributing factors to a fire are: (1) fuel, such as atomized paint spray, solvents, and paint residues; (2) heat, such as that derived from electrostatic corona discharges, sparking, and arcing from ungrounded workpieces, and so on; and (3) oxygen. If the fuel is heated above its ignition temperature (or "flash point") in the presence of oxygen, then a fire will occur.

An electrical spark can cause the temperature of a fuel to exceed its ignition temperature. For example, in a matter of seconds, a liquid spray gun fire can result from an ungrounded workpiece producing sparks, as the spray gun normally operates at very high voltages (in the 40,000 to 120,000 volt range). An electrical spark can cause the paint (fuel) to exceed its ignition temperature. The resulting spray gun fire can quickly produce radiant thermal energy sufficient to raise the temperature of the nearby paint residue on the booth walls or floor, causing the fire to quickly spread throughout the paint booth.

A fire may self-extinguish if one of the three above-mentioned contributing factors is eliminated. Thus, if the fuel supply of the fire is cut off, the fire typically stops. If a fire fails to self-extinguish, flame detectors are typically expected to activate suppression agents to extinguish the fire and thereby prevent major damage.

Flame detectors, which are an integral part of industrial operations such as the one described above, must meet standards set by the NFPA, which standards are becoming increasingly stringent. Thus, increased sensitivity, faster reaction times, and fewer false alarms are not only desirable, but are now a requirement.

There is a need for a sensitive, reliable and effective method and system for detecting sparks, flames, or fire with little or no interruptions caused by false alarms.

SUMMARY OF THE INVENTION

The present invention is directed in various aspects to a sensitive, reliable, intelligent and effective method and system for detecting sparks, flames or fire while reducing or eliminating interruptions caused by false alarms.

In a first aspect, a microprocessor-controlled detector advantageously senses temporal radiant energy in two different optical frequency ranges, such as, e.g., the MIR and VIS frequency ranges. Sensing temporal radiant energy in two different optical frequency ranges can be advantageously used to measure temporal radiant energy emitted from the environment, on the one hand, and temporal radiant energy emitted from false alarm sources on the other hand. Using mathematical techniques, such as, e.g., Fourier Transform analysis, the detector generates a first spectrum of frequency components from the temporal radiant energy sensed in the first optical frequency range, and a second spectrum of frequency components from the temporal radiant energy sensed in the second optical frequency range. In a preferred embodiment, the first and second spectra are respectively power spectra. The first and second spectra preferably represent a moving average. For example, a moving average of a spectrum can be generated by generating the spectrum every one-quarter second and averaging the four most current spectra over a one second time segment.

The detector then preferably performs a frequency bin subtraction on the two spectra of frequency components, i.e., a compensated spectrum of frequency components is generated by subtracting the second spectrum of frequency components from the first spectrum of frequency components. Preferably, the second spectrum of frequency components is scaled using a scaling factor equal to the ratio between the average amplitude of the first spectrum of frequency components over the second spectrum of frequency components. The compensated spectrum of frequency components is then analyzed to determine whether an unknown phenomenon represents an unwanted fire, or at least a possibility of an unwanted fire. In the preferred embodiment, an average amplitude and centroid of the compensated spectrum of frequency components are obtained. The greater the average amplitude and the more the centroid is centered between 2 Hz and 10 Hz, the greater the change that an unwanted fire exists.

In another aspect, a plurality of reference compensated spectra of frequency components are obtained from each of a variety of known unwanted fire sources and known false alarm sources. The respective average amplitudes and centroids of the reference compensated spectra are constructed into feature space coordinates, i.e., amplitude-centroid coordinates, and plotted on a feature space scatter plot. A fire detection boundary, which excludes substantially all of the feature space coordinates originating from known false alarm sources, is defined on the scatter plot. The fire detection boundary is then stored in memory for later comparison to when an unknown phenomenon is detected.

When the unknown phenomenon is detected, a compensated spectrum of frequency components is generated. The average amplitude and centroid of the compensated spectrum is then preferably constructed into a feature space coordinate, the location of which with respect to the fire detection boundary is indicative of whether the unknown phenomenon presents an unwanted fire situation. In particular, inclusion of the feature space coordinate inside the fire detection boundary indicates that the unknown phenomenon presents an unwanted fire situation. On the contrary, exclusion of the feature space outside the fire detection boundary indicates that the unknown phenomenon presents an unwanted fire detection. During detection of the unknown phenomenon, the fire detection boundary can be adjusted based on radiant energy sensed in a third optical frequency band, such as, e.g., the NIR frequency range.

Further embodiments, variations, modifications and enhancements are also disclosed herein.

BRIEF DESCRIPTION OF THE DRAWINGS

FIGS. 4 and 5 depict a table comparing fire/flame temperature and radiant energy calculations in various spectral regions.

DETAILED DESCRIPTION OF PREFERRED EMBODIMENTS

Processes and systems for detecting sparks, flames, or fire in accordance with preferred embodiments are described herein.

A particular embodiment of a process and system for fire detection is described in conjunction with an exemplary situation of an electrostatic coating operation. However, it should be understood that the process and system may be effectively utilized in any environment facing a threat from sparks, flames, or fire. For example, the process and system may be used in such applications as petrochemical facilities and refineries, semiconductor fabrication plants, co-generation plants, aircraft hangars, gas storage facilities, gas turbines and power plants, gas compressor stations, munitions plants, airbag manufacturing plants, and so on.

Figure 1:
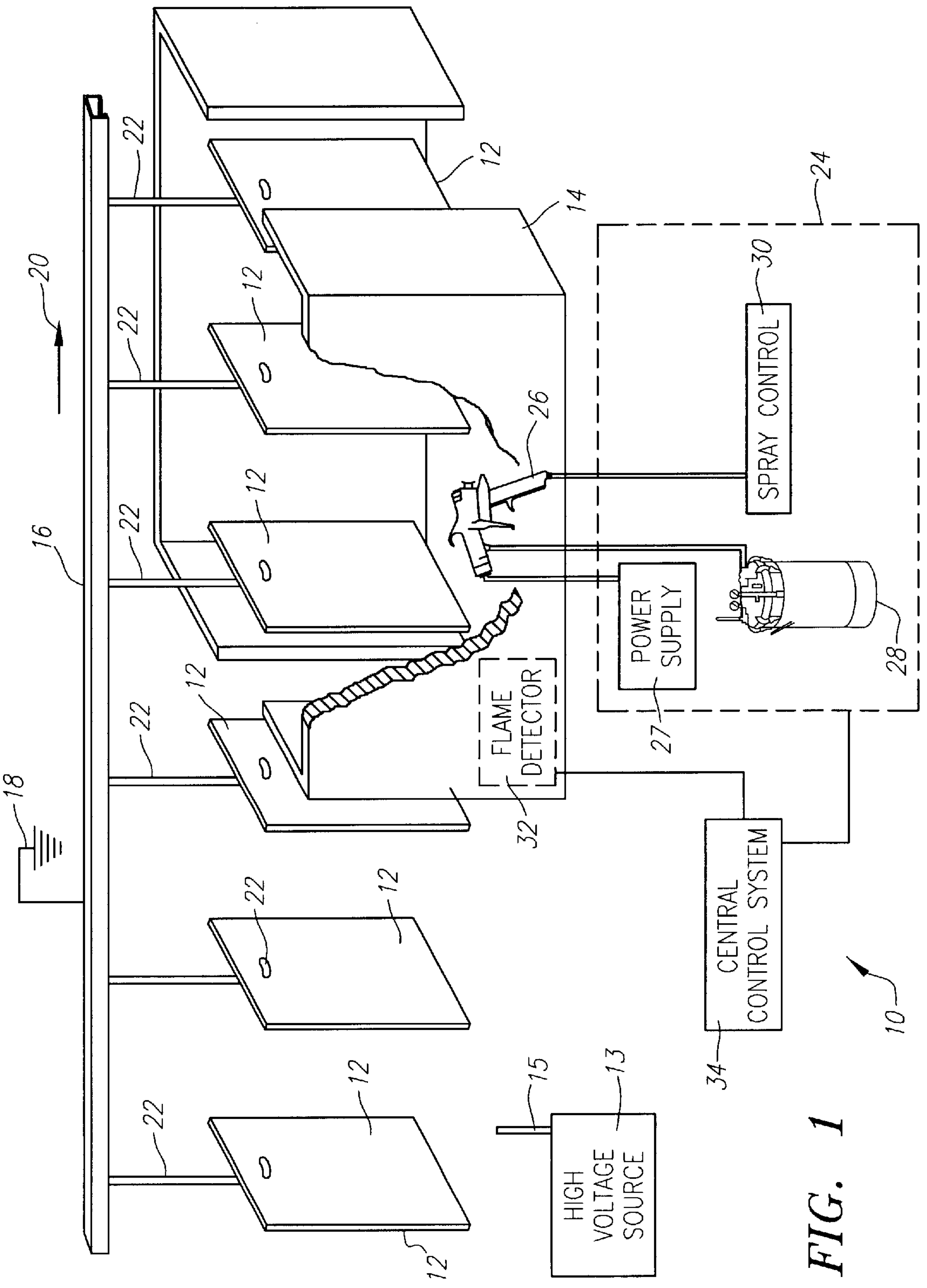
FIG. 1 is a diagrammatic illustration of an electrostatic coating booth, in which a fire detector according to one or more disclosed embodiments may be employed.

FIG. 1 illustrates an exemplary environment 10, as for example, a coating zone, such as a spray or paint booth or enclosure, in which electrostatic coating operations are routinely performed. As illustrated in FIG. 1, parts 12 are transported through the spray booth 14 by a conveyor 16 connected to a reference potential or ground 18. The direction in which the conveyor moves is indicated by an arrow 20. The parts 12 are typically supported from the conveyor by a conductive hook-like support or hanger 22. The parts 12 are passed proximate a high voltage source 13 with a high voltage antenna 15. The high voltage source 13 may be one available from Nordson as Model number EPU-9. Electrical charge is transferred from the high voltage source, which may operate between 60,000–120,000 volts, to the parts 12 to be coated.

The electrostatic coating system illustrated in FIG. 1 represents an air electrostatic spray system of a type used in many industrial operations. A typical industrial spray system 24 includes a spray gun 26 coupled to a power supply 27, a paint supply container 28 (for example, a pressure tank), and some form of spray control mechanism 30. The spray control mechanism 30 may include an air compressor and an air regulator (not separately shown).

A single flame detector component 32 is located at a strategic position within the spray booth 14. The detector component 32 can be advantageously manufactured from a substantially explosion-proof material, as discussed in greater detail below. Depending upon the size of the spray booth 14 or other facility, a plurality of such flame detector components 32 may be strategically located throughout the spray booth 14 or other facility.

Sensor data captured by the flame detector 32 can be relayed to a central control system 34 (see FIG. 1), which, in paint spray booth applications, may be located outside the spray booth 14. The central control system 34 may take the form of a computer with a central microprocessing unit, a display monitor, a suitable memory, and printing capabilities. The central control system 34 may coordinate functioning of the flame detectors 32 with other detection systems, as for ungrounded parts or the like.

Figure 2:
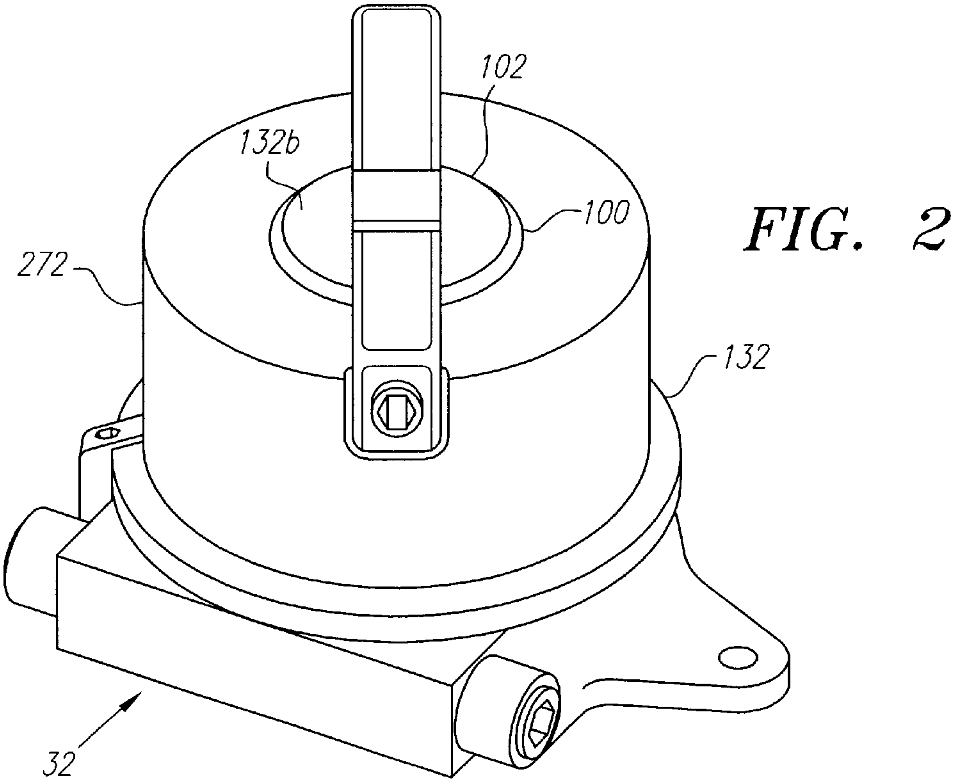
FIG. 2 is a perspective view of one housing embodiment in accordance with certain aspects of embodiments disclosed herein.

Referring to FIG. 2, the flame detector 32 is preferably enclosed within a protective housing 132 constructed with a viewing window **132*b* disposed over the sensors of the flame detector 32. The type of housing 132 (i.e., shape, material and/or configuration) may vary depending upon application and such things as environmental factors. Further details regarding the construction of the housing 132**, as well as the construction of alternative housings for use with the present invention, are disclosed in U.S. Pat. No. 6,064,064, and U.S. Prov. Appln. Ser. No. 60/151,191 entitled "Fire Detector With Protected Sensors," filed Aug. 27, 1999. Both of these applications are incorporated by reference herein as if set forth fully herein.

In order to rapidly detect all types of fires, whether hydrocarbon and nonhydrocarbon in nature, the flame detector 32 senses energy over a wide, continuous spectral band of infrared radiant energy. Preferably, the energy band observed by the flame detector 32 covers the range from about 0.4 to about 3.5 microns, and in particular, spectral ranges in the Visible Band (VIS) (400 to 700 nanometers), Near Band Infrared (NIR) (700 to 1100 nanometers), and Mid Band Infrared (MIR) (1100 to 3500 nanometers), to ensure that virtually all types of fires are detected. This spectral range constitutes the bulk of the radiant heat energy generated by an unwanted fire, including, for example, burning polypropylene or PVC plastic.

Figure 3:
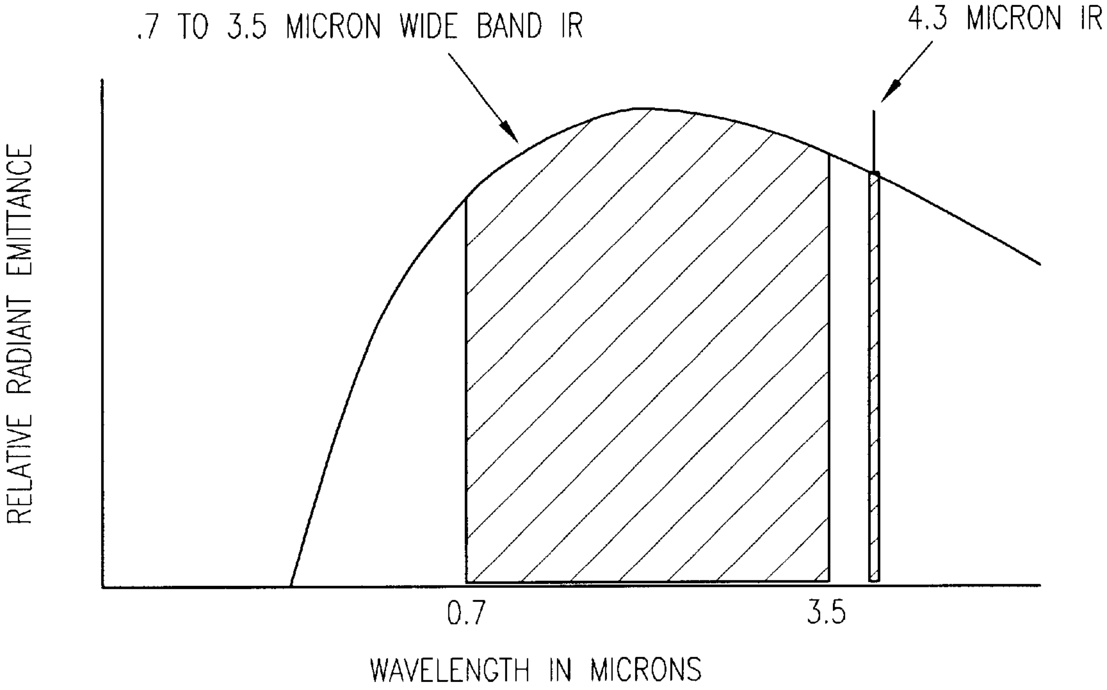
FIG. 3 is a graph illustrating relative radiant emittance at various wavelengths for a 2500 K degree fire.

FIG. 3 is a graph illustrating the energy emitted at various wavelengths by an exemplary fire source. As shown in FIG. 3, a large portion of the energy emitted by a typical fire occurs at wavelengths other than the 4.3 micron range, which is typically used to detect carbon-based fires. Accordingly, fire detections that rely solely on observing a $CO_2$ spike in the narrow 4.3 micron band are in effect observing only a small fraction of a fire's total energy radiation. In contrast, the flame detector 32 observes a much wider portion of the energy emitted by a fire.

By way of general background, all materials that burn in the condition known as an unwanted fire, which can be described as uncontrolled rapid oxidation, emit wideband blackbody radiant energy and molecular narrow band line emissions, such as the 4.3 micron $CO_2$ spike. (The term "blackbody" refers to a material's emissivity, and not its color.) The blackbody radiant emissions of a fire are always present and predictable because they are a function of the temperature of the materials being consumed by the fire, the temperature of the fire's gaseous flames and solid particulates, and the average emissivity of the flames, particulates, and burning material. Radiant emissions are the transfer of heat from one body to another without a temperature change in the medium; they are electromagnetic in nature and travel at the speed of light. They are, for example, the physical mechanism that transfers energy (heat) from the sun to the earth through airless outer space.

Blackbody radiant emissions are the primary reason that a fire feels hot at a distance. Because Kirchoff's Law states that a good emitter is also a good absorber for each wavelength, a blackbody may be defined as an ideal body that completely absorbs all radiant energy striking it, and therefore, appears perfectly black at all wavelengths. Emissivity may be defined as the ratio of an object's radiance to that emitted by a blackbody radiator at the same temperature and at the same wavelength. A perfect blackbody has an emissivity of one. Highly reflective surfaces have a low emissivity, but most materials that burn easily have emissivities of 0.5 or greater. The radiation emitted by a blackbody is referred to as Planck's Blackbody Radiation Law.

Figure 6:
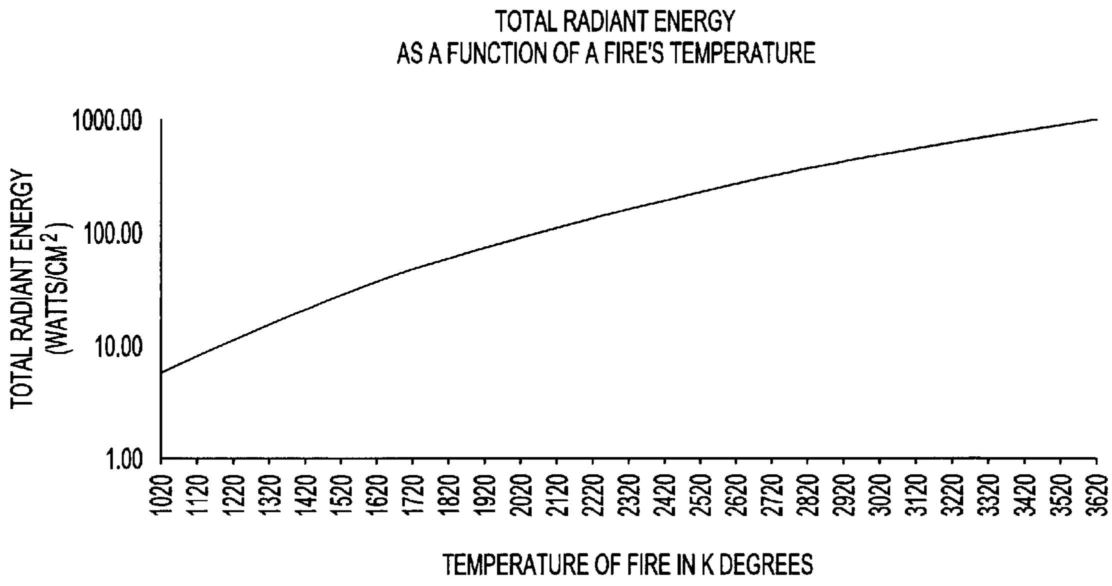
FIG. 6 is a graph of radiant energy as a function of fire temperature.
Figure 7:
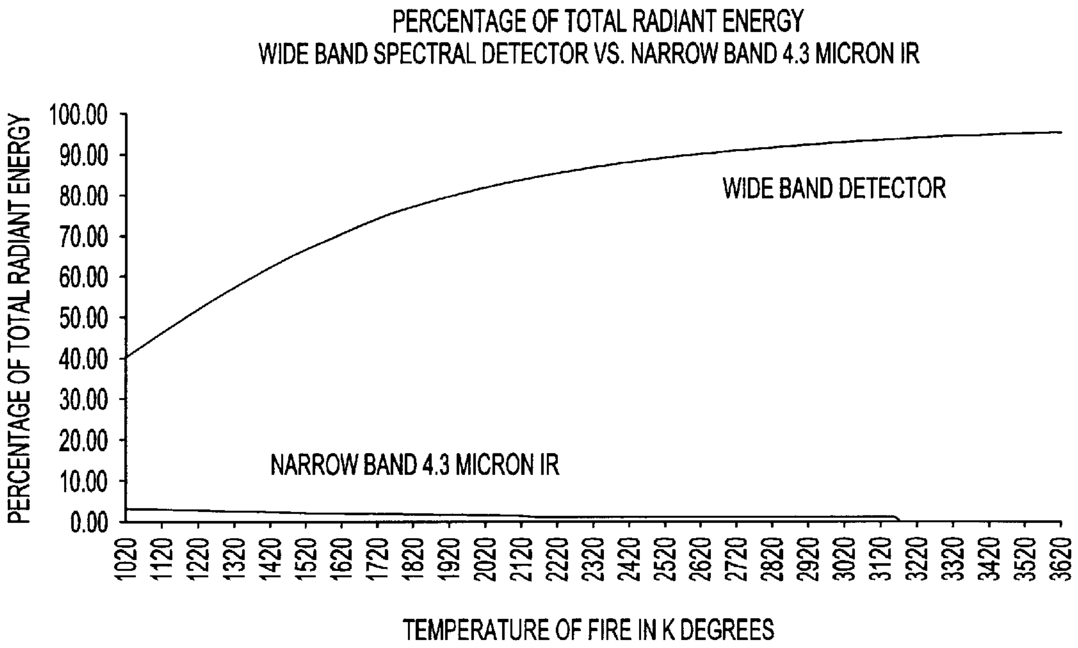
FIGS. 7 and 8 are graphs comparing a detected radiant energy for a wide band spectral detector versus a narrow band 4.3 micron infrared detector as a function of fire temperature.
Figure 8:
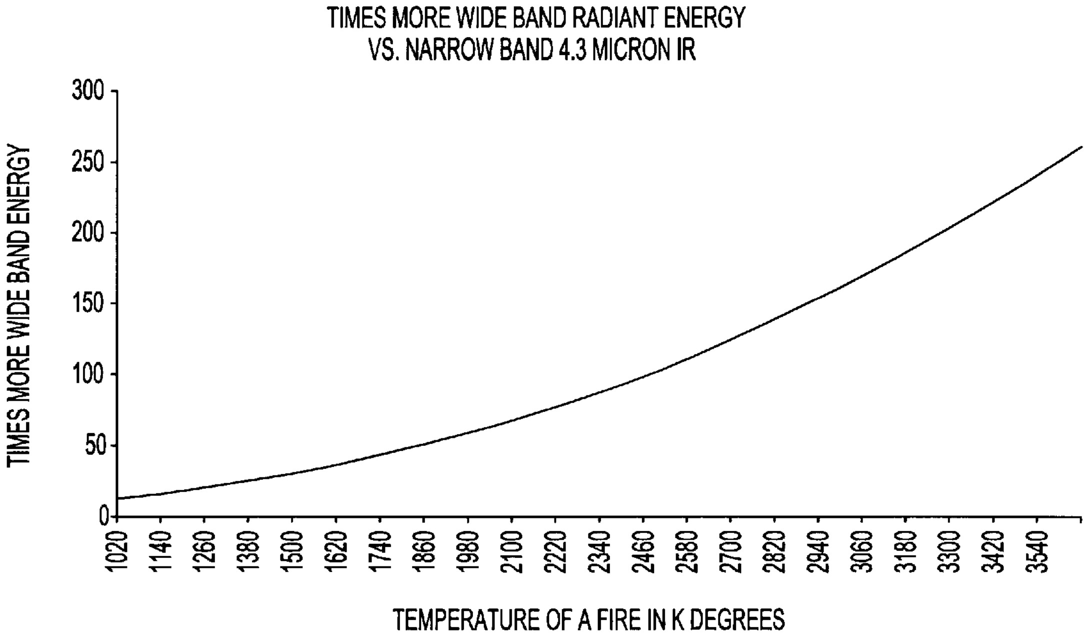

FIGS. 4–8 can be used to compare the amount of energy emitted at different energy bands by fires of different temperatures, and therefore the amount of energy that can be detected by sensors operating at different energy bands. FIGS. 4 and 5 are tables containing data comparing the heat of a fire (in degrees Kelvin), its total radiant energy (in watts/cm$^2$) over the VIS, NIR and MIR ranges, its radiant energy in the narrowband IR range, and the relative percentages of narrowband IR energy versus the composite of VIS, NIR and MIR energy. FIGS. 6, 7 and 8 are graphs illustrating the information in the table of FIGS. 4 and 5. The table and graphs of FIGS. 4–8 indicate that a fire emits far more energy in the wideband spectra than in the narrow band IR range.

FIG. 6 is a graph showing total radiant energy as a function of a fire's temperature. As shown in FIG. 6, the total radiant energy generally increases as a function of the fire's temperature. FIGS. 7 and 8 compare in different aspects the amount of the fire's energy observable by a wideband detector versus a narrowband detector. FIG. 7 compares the percentage of radiant energy detected by a wideband detector and a narrowband detector as a function of the fire's temperature, while FIG. 8 is a graph showing a plot of the relative increase in energy detected by a wideband detector over a narrowband detector, as a function of the fire's temperature.

The information appearing in FIGS. 4–8 has been derived as follows. First, the formula for calculating the total heat radiation at all wavelengths from a perfect blackbody is known as the Stefan-Boltzmann Law:

$$W=\sigma T^4$$

where W is the total radiation emitted in watts/$m^2$, T is the absolute temperature in ° K (degrees Kelvin), and $\sigma$ is the Stefan-Boltzmann constant, $5.67\times10^{-8}$ watt/$m^2K^4$. The Stefan-Boltzmann Law indicates that the total radiant emitted energy from a surface is proportional to the fourth power of its absolute temperature; consequently, the hotter the body is, the greater the wide-band infrared radiation that is emitted. To obtain a more precise value of W, the total radiant blackbody energy emitted using the Stefan-Boltzmann Law can be multiplied by the average emissivity of the burning materials, which can be approximated by 0.5.

Planck's Radiation Law may be used to calculate the continuous radiant energy distribution among the various wavelengths. For all the wavelengths from 0 to 100 microns, the radiated energy should be equal to the total radiated energy calculated by the Stefan-Boltzmann Law. The detected percentage of radiated energy is found by calculating the energy in the wavelength span covered by an optical fire detector with the total energy radiated by the fire using the Stefan-Boltzmann Law. Planck's formula for calculating the total radiated energy between first and second wavelengths λ1 and λ2 is as follows:

$$W_{\lambda1-\lambda2}=2_{\pi}hc^2\int 1/((\lambda^5(e^{hc/\lambda(kT)}-1))d\lambda$$

where h=Planck's constant, $6.63\times10^{-34}$ joule-sec., c=speed of light, $3.00\times10^{10}$ cm/sec., λ=wavelength in cm (10–2 meters), T=absolute temperature in degrees Kelvin, and k=Boltzmann constant, $1.38\times10^{-23}$ joules/° K.

Using Plank's formula and integrating over the wavelength range from 0.4 to 3.5 microns, it can be determined that an "ideal" optical fire detector with a wide band spectral range of 0.4 to 3.5 microns is theoretically capable of sensing, for example, about 88.23% of the total radiated energy at a fire/flame temperature of 2500 degrees Kelvin (K) (2226.85 degrees Celsius), as appears in the information contained in the tables of FIGS. 4 and 5. For reference, the temperature of a typical clean burning flame generally varies from between 1400 and 3500 degrees K.

Figure 9:
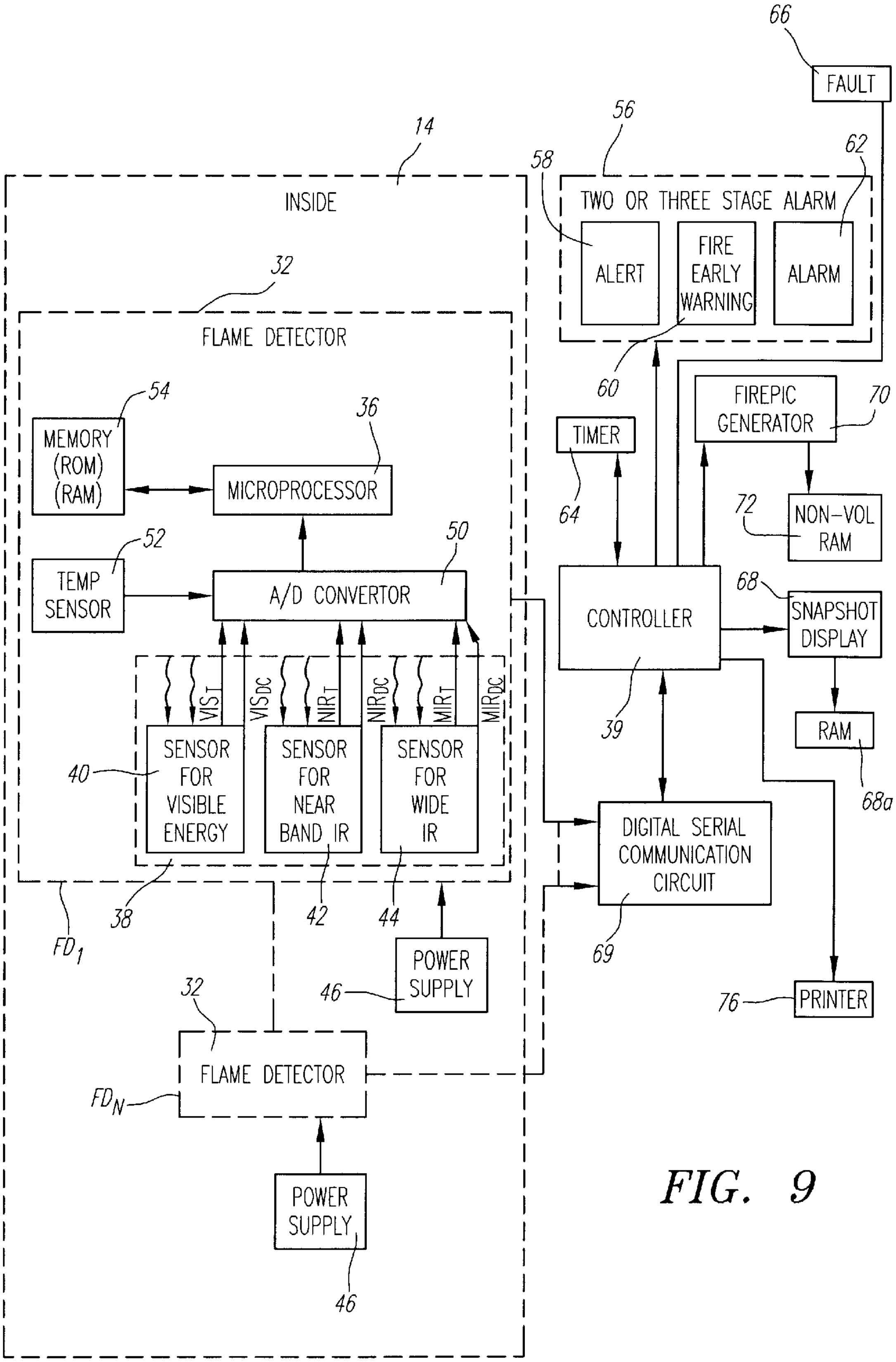
FIG. 9 is a block diagram representation of a preferred embodiment of a flame detection system in accordance with various aspects of embodiments disclosed herein, wherein a single or a series of flame detector components are located inside a desired facility, such as a paint booth, and a controller component of the system is located outside the facility for processing data captured by the sensors.
Figure 10:
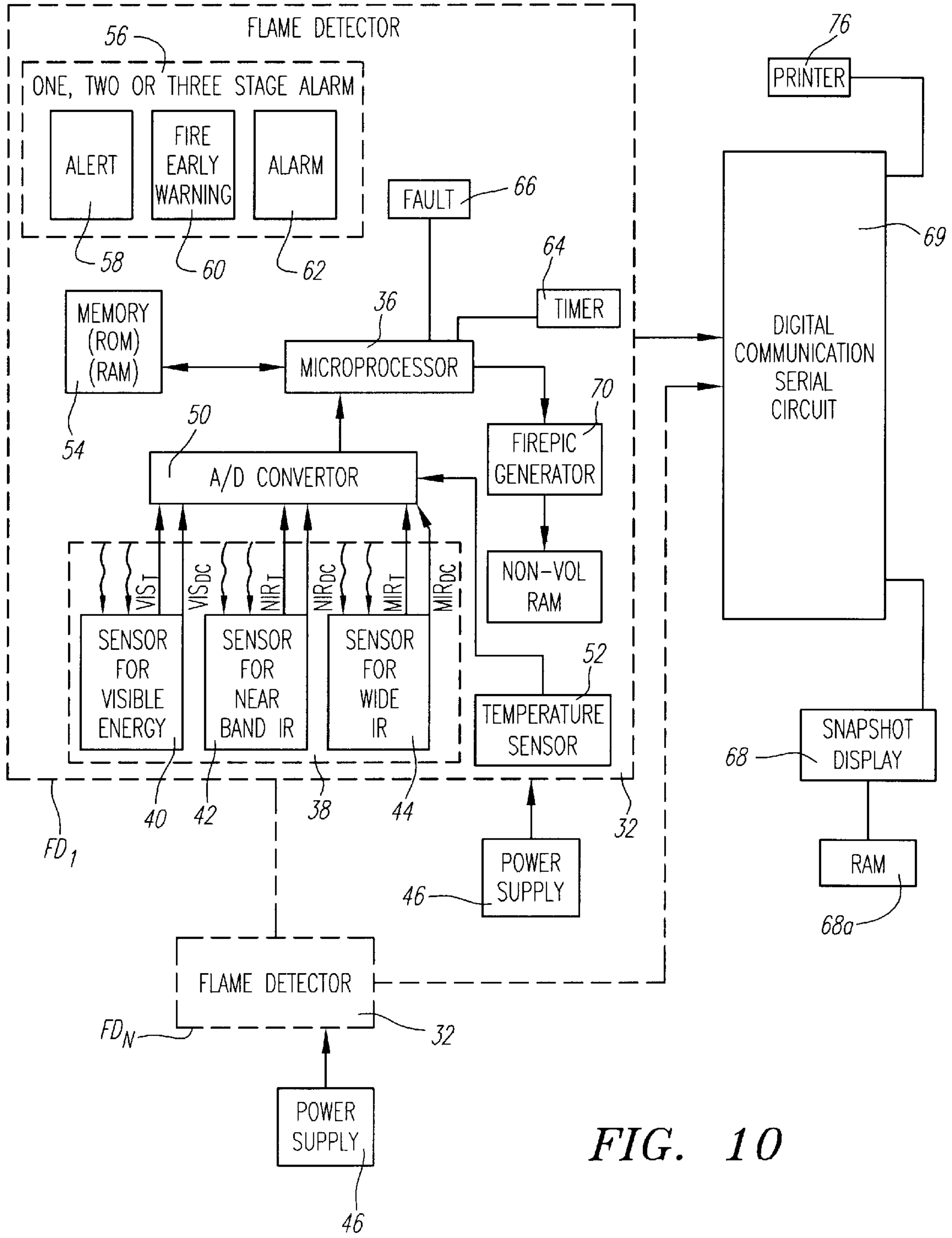
FIG. 10 is a block diagram representation of an alternative preferred embodiment of a flame detection system, wherein a single or a series of detectors incorporate a microprocessor and process data captured by the system in the detector component.

FIGS. 9 and 10 are block diagrams depicting embodiments of the flame detector 32. In accordance with one embodiment of the present system (FIG. 9), a single flame detector 32 located at a particular location, indicated by reference letters FD1, or a plurality of flame detectors 32, located at a plurality of different locations, indicated by reference letter FDN, may be located, for example, inside the spray booth 14 (see FIG. 1). A power supply 46, typically operating at 24 volts, supplies power to the flame detector 32.

The flame detector 32 includes a sensor array 38 that comprises a VIS sensor 40, which searches for and detects radiant energy within the VIS spectrum, an NIR sensor 42, which searches for and detects radiant energy within the NIR spectrum, and an MIR sensor 44, which searches for and detects radiant energy within the MIR spectrum. Suitable silicon (Si) photodiode sensors can be used for detecting radiant energy within the VIS and NIR spectrums. A suitable lead sulfide (PbS) sensor can be used for detecting radiant energy within the MIR spectrum. Further details regarding the use of various types of sensors for sensing in the wide band infrared spectrum is disclosed in U.S. Pat. No. 6,064, 064, previously incorporated herein by reference as if set forth fully herein.

It will be understood that while a preferred embodiment is described with respect to use of three sensors (i.e., a VIS sensor, an NIR sensor, and a MIR sensor), other sensor arrangements can be used to obtain the same or equivalent results. For example, a flame detector may use a number of sensors each operating over a distinct narrow energy band range, and sum up the sensor outputs so as to obtain an indicia of total blackbody energy. While such a design would be more complicated due to the greater number of sensors, the same principles of flame detection as previously described would apply to such a configuration.

The flame detector 32 further includes an analog-to-digital (A/D) converter 50, which receives a continuous stream of analog sensor signals from each of the sensors 40, 42, 44 of the sensor array 38, and converts the analog signals into digital signals for storage and selective processing by a controller 39 (microprocessor, or microcomputer) external to the flame detector 32. A controller 36 (or microprocessor, or microcomputer) internal to the flame detector 32 can also be employed to process the signals from each of the sensors 40, 42 and 44. In a preferred embodiment, an Intel 8051 microprocessor or microcomputer is utilized. As will be described in further detail below, the controller 39 executes an algorithm that analyzes the sensor digital data and determines if there is any sign of sparks, flames, or fire (whether or not visible to the human eye).

A temperature sensor 52 located within the flame detector 32 serves to indicate ambient temperature values for calibration purposes. A memory component 54 within the flame detector 32 comprises ROM (Read Only Memory) and RAM (Random Access Memory) for temporary and permanent storage of data, as for storing instructions for the controller 39, for performing intermediate calculations, or the like.

Figure 11:
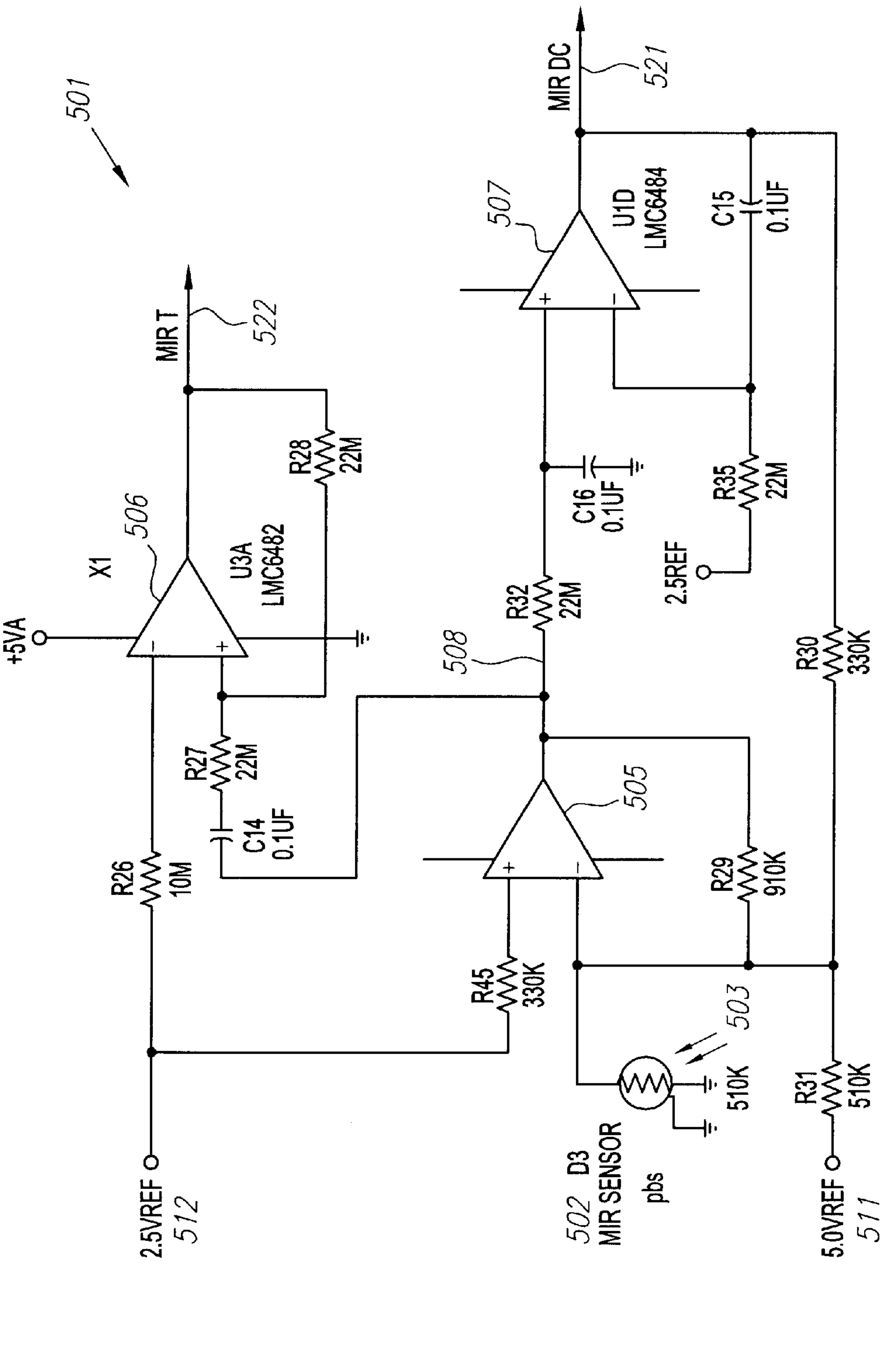
FIG. 11 is a diagram of a circuit for processing a sensor input signal.

Prior to digitization by the A/D converter 50, the sensor data is separated into transient and DC components. In particular, FIG. 11 shows a signal processing circuit for processing a sensor input signal and, more particularly, a circuit for processing an output from the MIR sensor 44, and generating a first signal 521 indicative of a DC level of the sensor output and a second signal 522 indicative of a transient level of the sensor output. The MIR sensor 44 acts similar to a variable resistor, having a resistance that depends on the amount of radiant energy detected in the MIR range. The output of the MIR sensor 44 is provided to an amplifier 505 which is biased using a 2.5 volt reference signal 512 and a 5 volt reference signal 511 with suitable resistance values as shown in FIG. 11. The amplifier 505 produces a first amplified signal 508 that is low-pass filtered by the collective action of resistor R32 and capacitor C16, and then integrated and scaled using amplifier 507 to arrive at a MIR DC output signal 521.

The first amplified signal 508 is also high-pass filtered using capacitor C14 and then amplified by amplifier 506, which essentially acts as a buffer, to arrive at a MIR transient output signal 522, designated $MIR_T$ herein. The circuit 501 of FIG. 11 thereby outputs both a MIR DC output signal 521 and a MIR transient output signal 522.

A circuit similar to the circuit shown in FIG. 11 is provided for processing the output of the NIR detector 42 and producing two signals indicative of a DC level and transient level, respectively, of the NIR detector output, except the component values of the elements of the circuit would be altered to match the characteristics of the NIR sensor 42 as may be readily accomplished by one skilled in the art. Likewise, a circuit similar to the circuit shown in FIG. 11 is provided for processing the output of the VIS detector 40 and producing two signals indicative of a DC level and transient level, respectively, of the VIS detector output, except the component values of the elements of the circuit would be altered to match the characteristics of the VIS sensor 40.

Each of the DC and transient signals for the MIR sensor 44, NIR sensor 42, and VIS sensor 40 is sampled and converted into the digital domain by the A/D converters 50 (or alternatively, three respective A/D converters). The A/D converter 50 outputs digitally sampled sensor signals, which are designated in FIG. 9 as $MIR_{DC}$, $NIR_{DC}$, and $VIS_{DC}$, respectively, each representing the "raw" DC component of the DC signal from the corresponding sensors 44, 42 and 40. The A/D converter 50 also outputs digitally sampled sensor signals, which are designated in FIG. 9 as $MIR_T$, $NIR_T$, and $VIS_T$, respectively, each representing the "transient" component of the signal from corresponding sensors 44, 42 and 40.

In a preferred embodiment, the MIR sensor (sensor 44) is used as the primary sensor in the optical fire/flame detectors. The MIR sensor 44 can, however, be susceptible to various false-alarm sources, including sunlight, bright lights, ovens, and other sources of MIR radiation. In order to successfully use the MIR sensor 44 as the primary sensor without false alarms from broadband energy sources, the flame detector 32 includes a means for discriminating between dangerous fire sources and false alarm sources.

To this end, the flame detector 32 observes the changes in radiant energy over time to make a better determination of whether a fire is occurring, as opposed to a non-fire event that may otherwise result in a false alarm trigger. Further characteristics of a fire can therefore be used to improve the detection ability of the flame detector 32.

For example, it has been observed by the inventors that the wide, continuous band of blackbody radiant energy pulsates as the fire's rising thermal energy causes the burning material(s) to further outgas, consuming more oxygen in rapid, irregular, exothermic chemical reactions. As the temperature of the fire further rises, the radiant blackbody energy correspondingly increases and the carbon particulates, if the fire is a hydrocarbon type (i.e., a fire involving hydrogen and carbon), remain after the other outgassing components are consumed. These hot carbon particles also radiate blackbody emissions and their emissivity is high.

A calm, controlled fire, such as a candle burning in still air, radiates a constant blackbody radiant heat of the gaseous flame and particulates that can be felt within about one foot of the flame. In contrast, for an uncontrolled, unwanted fire, especially a growing fire, the radiant heat that is felt by the hand at a distance is pulsating and irregular. It has been observed by the inventors that most threatening fires tend to pulsate at a rate of approximately 2 to 10 Hertz (although the upper limit may be higher). This flickering or pulsating causes ripples to occur at a similar rate in the detected blackbody energy.

The differences between uncontrolled, unwanted fires and calm, controlled fires or non-fire energy sources can be advantageously used by the flame detector 32 to discriminate between fire situations which call for a response and situations which call for no response or merely continued monitoring. For example, the flame detector 32 may observe the frequency and regularity at which the detected radiant energy is pulsating, and thereby weed out potential false alarm situations. For example, if the flame detector 32 observes that the detected energy has a time-varying component between 2 and 10 Hertz, the flame detector 32 may conclude that a potential unwanted fire situation exists. If, on the other hand, the flame detector 32 observes that the detected energy has no time-varying component, or has one or more time-varying components outside of the 2 to 10 Hertz frequency band, then the flame detector 32 may conclude that it is unlikely that a fire situation exists.

In one embodiment, processing techniques such as Fast Fourier Transforms (FFT's) are used to separate the temporal radiant energy spectral response of the WBIR, NBIR, and VB spectra into the individual Fourier components, thereby transforming the spectral radiant energy received as a function of time into a representation of radiant energy received as a function of frequency. By subtracting the individual frequency components of the non-fire sources from the individual frequency component of a real fire, a compensated energy level can be obtained, which is then used to eliminate potential false alarm sources as described above.

In more detail, FFT's can be used by the controller 39 to obtain individual Fourier components for each of the WBIR, NBIR and VB sensors at each a plurality of predetermined frequencies (such as 2, 5, 7 and 10 Hertz, for example). The magnitudes of WBIR frequency components are compared for each of the predetermined frequencies against the magnitudes of the VB frequency components, to arrive at a first set of energy level comparison values. Similarly, the magnitudes of WBIR frequency components are compared for each of the predetermined frequencies against the magnitudes of the NIR frequency components, to arrive at a second set of energy level comparison values. The first set of energy level comparison values and second set of energy comparison values may be applied to a lookup table to determine whether the profile matches that of a fire or potential fire situation.

In one or more embodiments, the controller 39 performs a Fourier transform analysis of the temporal energy sensed by the MIR sensor 44 (i.e., the $MIR_T$ energy) and the temporal energy sensed by the VIS sensor 40 (i.e., the $VIS_T$ energy) to determine if a dangerous fire is present. The frequency spectrum of a fire is determined by both the size of the fire and the geometry of its combustion source (e.g., spills from fuel containers, open gas valves, pinhole leaks in hoses, etc.), and is discernible from other false alarm sources.

Figure 19:
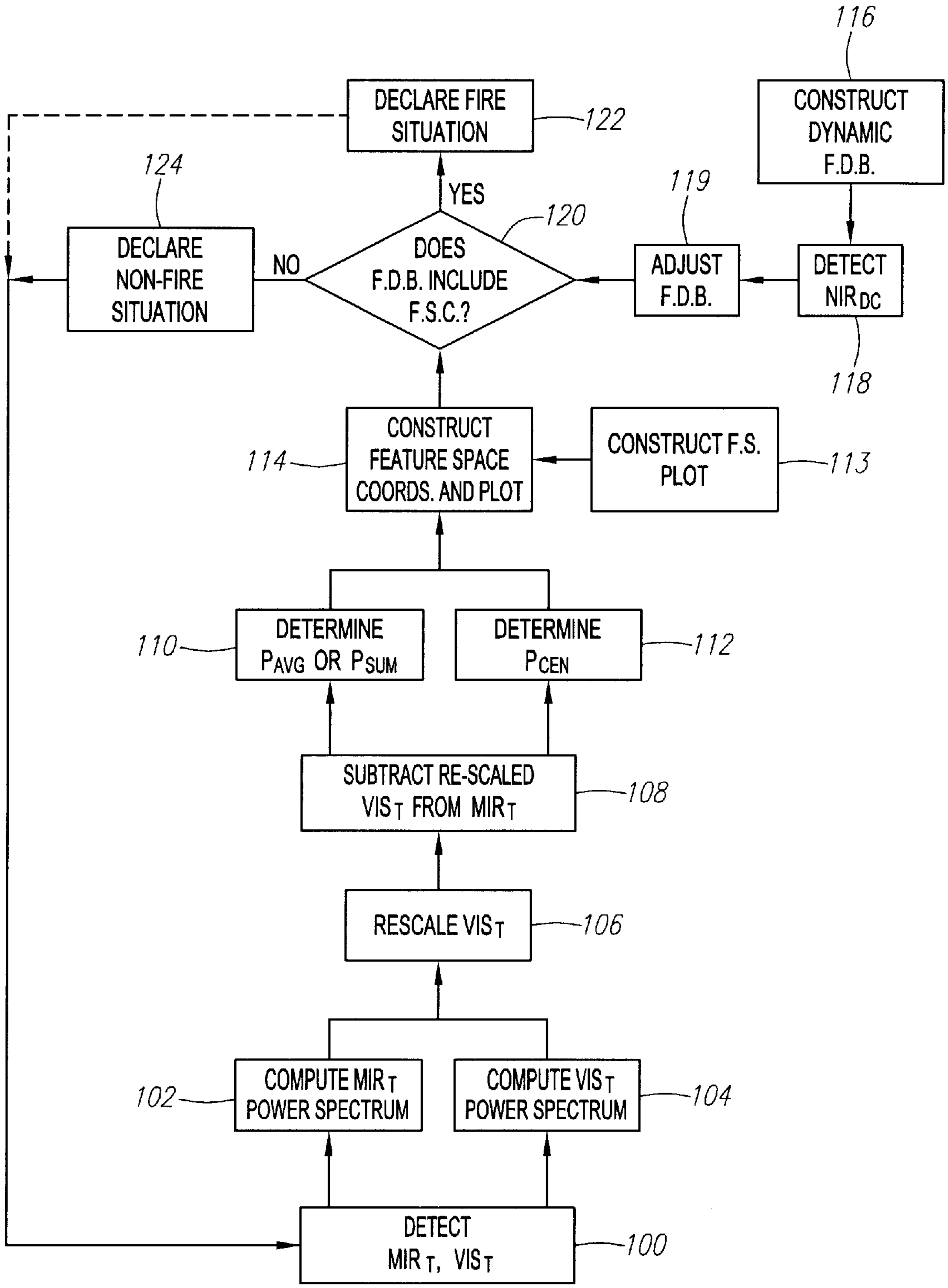
FIG. 19 is a logic flow diagram of a preferred method of detecting an unwanted fire situation employed in the flame detection system of FIGS. 9 and 10.

FIG. 19 illustrates the steps carried out by the controller 39 in accordance with one method for determining whether a monitored unknown phenomenon poses a fire danger. According to the method illustrated in FIG. 19, the $MIR_T$ and $VIS_T$ digital data are detected and obtained from the respective MIR and VIS sensors 44 and 40 and associated circuitry (i.e., the A/D converter 50 and signal processing circuitry) (step 100). $MIR_T$ and $VIS_T$ power spectra frequency components are respectively generated from the $MIR_T$ and $VIS_T$ digital data (steps 102 and 104). Specifically, from an array of either $MIR_T$ or $VIS_T$ time-sampled digital data, represented generally as F(nt) (i.e., the amplitude of the sensed energy as a function of discrete time), the discrete Fourier transform (DFT) may be derived as follows:

$$\mathcal{F}(mf) = \sum_n F(nt)e^{-2\pi imnft},$$

where F denotes the Fourier transform, m is a frequency index, f is the frequency increment between successive samples in the frequency domain, n is a time index, and t is the time increment between successive samples in the time domain. The foregoing transform analysis should conform to the following general rules: (1) the product ft should be equal to 1/(the number of samples); (2) t is less than or equal to 1/(two times the highest possible spectrum frequency); and (3) f is greater than or equal to two times the highest possible spectrum frequency. For example, given a one-second record of data sampled at 64 Hz, the time increment t is 0.015625 seconds and the frequency increment f is 1 Hz for 64 samples.

The Fourier transform of an arbitrary real-time function results in a complex frequency spectrum: a frequency distribution composed of the real parts of the spectrum, and a frequency distribution composed of the imaginary parts of the spectrum. That is, in terms of real and imaginary components, the discrete Fourier transform is given as:

$$\mathcal{F}(mf) = \sum_n F(nt)\cos(2\pi mnft) - i\sum_n F(nt)\sin(\pi mnft)$$

The power spectrum provides a method for uniting these two frequency distributions into a singular frequency spectrum, the integral of which is proportional to the power emitted by the source. The power spectrum P(mf) of a temporal signal F(nt) is defined by:

$$P(mf)=(\Im_r(mf)^2+\Im_i(mf)^2)/N,$$

where $F_r(m)$ and $F_i(m)$ are real and imaginary parts of the fast Fourier transform (FFT), respectively, N is the number of samples in the time domain, m is the frequency index, t is the time increment, and f is the frequency increment. Of course, when comparing the power spectrum to a reference threshold, rather than dividing the power spectrum by N, the reference threshold can be multiplied by N. It should be noted that the FFT is a technique for computing the DFT with a considerable reduction in the number of computations, wherein the maximum efficiency of FFT computation is achieved by constraining the number of points sampled in the time-domain to be an integer power of two.

As demonstrated above, the temporal radiant energy spectral response of energy emitted from the environment can be separated into individual Fourier components, thereby transforming the spectral radiant energy received as a function of time into a representation of radiant energy received as a function of frequency. In the illustrated embodiment, the temporal energy sensed by the MIR sensor 44, i.e., the $MIR_T$ energy, is transformed into an $MIR_T$ power spectrum of frequency components calculate over a fixed window of time (e.g., one second), which calculation is repeated over subsequent fixed windows of time. Of course, other window sizes can be used.

Alternatively, the $MIR_T$ power spectrum can be calculated over a moving averaged window of time to generate a moving averaged power spectrum, i.e., a power spectrum that is generated periodically (e.g., every one-quarter second) and averaged over a time segment (e.g., one second) of the $MIR_T$ digitized data. In this manner, the algorithm employed by the controller 39 does not overreact to frequency spikes or erroneous data.

Similarly, the temporal energy sensed by the VIS sensor 40, i.e., the $VIS_T$ energy, is transformed into a $VIS_T$ power spectrum of frequency components. Like, the $MIR_T$ power spectrum, the $VIS_T$ power spectrum can either be calculated over a fixed window of time or a moving averaged window of time. In the illustrated embodiment, the frequency domains of the respective $MIR_T$ and $VIS_T$ power spectra range from 0 Hz to 32 Hz. Exemplary illustrations of the $MIR_T$ and $VIS_T$ power spectra are shown respectively in FIGS. 12 and 13.

As discussed briefly above, the energy sensed by the MIR sensor 44 represents MIR energy emitted from unwanted fire sources, as well as false alarm sources. The energy sensed by the VIS sensor 40 represents VIS energy emitted from VIS emitting false alarm sources, such as, e.g., artificial light and sunlight, and is generally proportional to the MIR energy emitted from these false alarm sources. In this connection, a compensated power spectrum, which represents the MIR emitted from a monitored phenomenon absent the MIR energy emitted from false alarm sources that also emit VIS energy, can be obtained.

In particular, a frequency bin subtraction analysis is performed on the respective $MIR_T$ and $VIS_T$ power spectra by, first, resealing the $VIS_T$ power spectrum (step 106) , and then subtracting the individual frequency components of the $VIS_T$ power spectrum from the corresponding individual frequency components of the $MIR_T$ power spectrum.

The $VIS_T$ power spectrum is rescaled, so that the proper magnitudes of the individual $VIS_T$ frequency components are subtracted from the corresponding magnitudes of the individual $MIR_T$ frequency components. The resealing factor of the $VIS_T$ power spectrum is determined by first obtaining only those frequency components of the $VIS_T$ power spectrum that have amplitudes greater than a predetermined noise floor threshold. The noise floor threshold can be empirically determined by quantifying the peak noise value of a power spectrum generated during from energy sensed in an ambient environment, i.e., an environment without fire or false alarm sources. Next, the individual frequency component amplitudes of the $VIS_T$ power spectrum are averaged to determine the $VIS_T$ average power spectrum amplitude. The following equation can be used to calculate this parameter:

$$VIST_{AVG} = \frac{1}{M}\sum_{m=1}^{M} VIST[m],$$

where $VIST_{AVG}$ is the $VIS_T$ average power spectrum amplitude, M is the number of $VIS_T$ frequency components, the respective amplitudes of which exceed the noise floor threshold, m is the frequency component index, and $VIS_T$ is the respective frequency component amplitude of the $VIS_T$ power spectrum.

Next, the individual frequency component amplitudes of the $MIR_T$ power spectrum are averaged to determine the $MIR_T$ average power spectrum amplitude. The following equation can be used to calculate this parameter:

$$MIRT_{AVG} = \frac{1}{M}\sum_{m=1}^{M} MIRT[m],$$

where $MIRT_{AVG}$ is the $MIR_T$ average power spectrum amplitude, M is the number of $VIS_T$ frequency components, the respective amplitudes of which exceed the noise floor threshold, m is the frequency component index, and MIRT is the respective frequency component amplitude of the $MIR_T$ power spectrum.

A resealing factor is then determined based on the $MIR_T$ average power spectrum amplitude and the $VIS_T$ average power spectrum amplitude. Specifically, the resealing factor is equal to the ratio of the $MIR_T$ average power spectrum amplitude over the $VIS_T$ average power spectrum amplitude. The following equation can be used to calculate this parameter:

$$r = \frac{MIRT_{AVG}}{VIST_{AVG}},$$

where r is the resealing factor used to rescale each of the individual frequency components of $VIS_T$ power spectrum.

Figure 14:
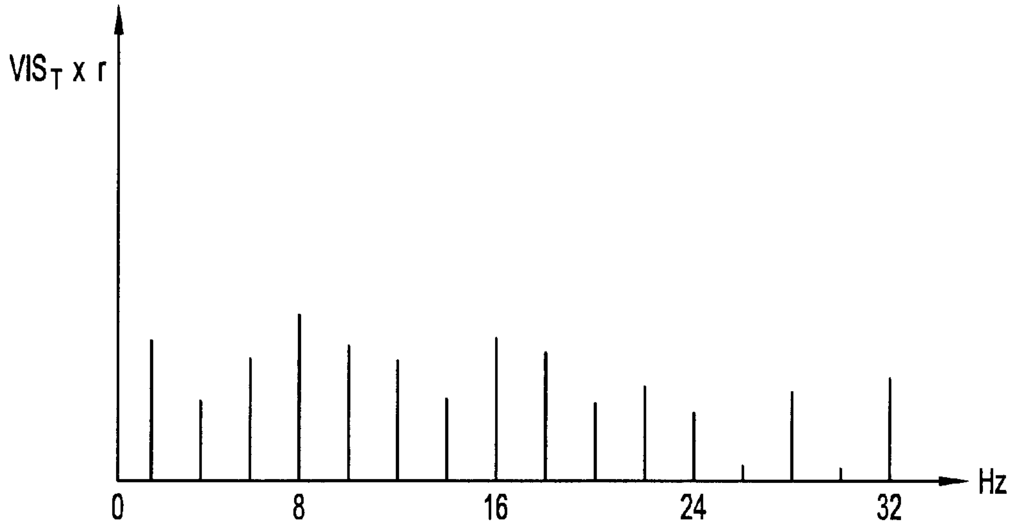
FIG. 14 is an exemplary graph of the power spectrum of FIG. 13 rescaled.

Each frequency component of the $VIS_T$ power spectrum is then multiplied by the scaling factor r as determined above. An exemplary illustration of the rescaled $VIS_T$ power spectrum is shown in FIG. 14.

Figure 15:
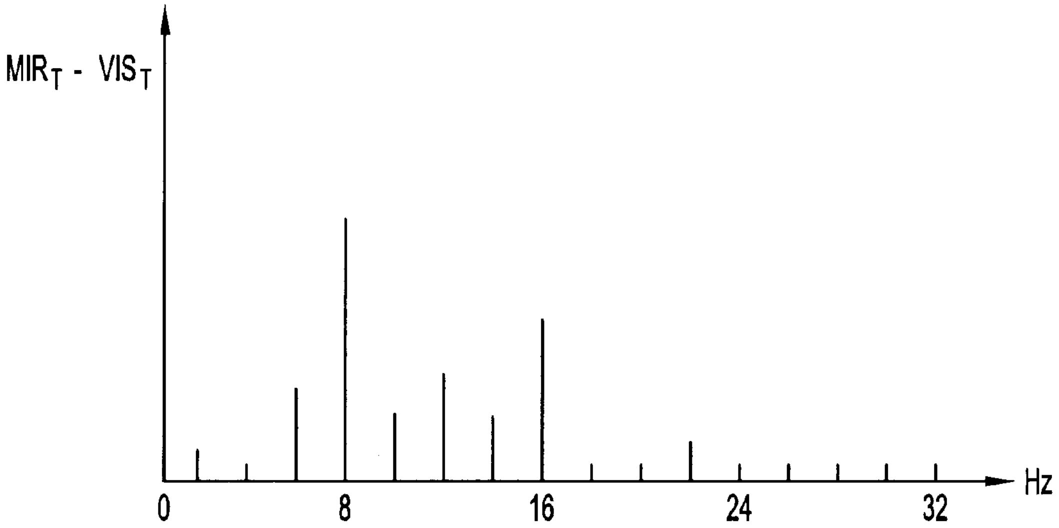
FIG. 15 is an exemplary graph of a compensated power spectrum of frequency components generated by subtracting the rescaled VIS power spectrum of frequency components of FIG. 14 from the MIR power spectrum of frequency components of FIG. 12.

After the $VIS_T$ power spectrum has been rescaled, the frequency bin subtraction is then completed by subtracting the rescaled $VIS_T$ power spectrum from the $MIR_T$ power spectrum bin-by-bin, i.e., the rescaled frequency components of the $VIS_T$ power spectrum are subtracted from the corresponding frequency components of the $MIR_T$ power spectrum. If the difference between two corresponding frequency components is negative, the frequency bin is set to zero. Otherwise, the new value of the frequency bin is the resulting difference between the corresponding frequency components. The resulting frequency bins can be constructed into the compensated power spectrum. An exemplary illustration of the compensated power spectrum is shown in FIG. 15.

The compensated power spectrum can then be analyzed to detect an unwanted fire situation, while at the same time minimizing the danger of false alarms. In particular, an average amplitude of the compensated power spectrum is determined (step 110), which can be calculated using the following equation:

$$P_{AVG} = \frac{1}{M}\sum_{m=1}^{M} P(m),$$

where $P_{AVG}$ is the average amplitude of the compensated power spectrum, M is the number of frequency components (i.e., number of samples in the frequency domain), m is the frequency component index, and P(m) is the amplitude of each frequency component, i.e., bin.

Alternatively, a sum of the compensated power spectrum amplitudes are determined, which can be calculated using the following equation:

$$P_{SUM} = \sum_{m=1}^{M} P(m),$$

where $P_{SUM}$ is the sum of the compensated power spectrum amplitudes, m is the frequency component index, and P(m) is the amplitude of each frequency component, i.e., bin.

The average amplitude of the compensated power spectrum $P_{AVG}$, or sum of the compensated power spectrum amplitudes $P_{SUM}$, indicates the intensity of the energy emitted from the monitored phenomenon. Thus, the greater the average compensated power spectrum amplitude $P_{avg}$, or sum of the compensated power spectrum amplitudes $P_{SUM}$, the greater the chance that the monitored phenomenon is an unwanted fire.

A centroid of the compensated power spectrum is also determined (step 112). The centroid of the compensated power spectrum can be calculated using the following equation:

$$P_{CEN} = \frac{\sum_{m=1}^{M} mP(m)dm}{\sum_{m=1}^{M} P(m)},$$

where $P_{CEN}$ is the centroid of the compensated power spectrum, M is the number of frequency components, m is the frequency component index, P(m) is the amplitude of each frequency component, and dm is the size of the bin in the frequency domain. The compensated power spectrum centroid $P_{CEN}$ indicates a center of gravity of the frequency components in which the amplitude of the compensated power spectrum is concentrated. As discussed briefly above, the frequency components obtained from energy emitted from dangerous fires tends to be concentrated between 2 Hz and 10 Hz. The compensated power spectrum centroid $P_{CEN}$ indicates the frequency characteristics of the energy emitted by the monitored phenomenon. Thus, generally, the more the compensated power spectrum centroid $P_{CEN}$ is centered in between the 2 Hz and 10 Hz range, the greater the chance that the monitored phenomenon is an unwanted fire.

The compensated power spectrum can be compared to the profiles generated from various dangerous fire and false alarm sources to facilitate the determination of unwanted fires, while eliminating false alarms. To facilitate this comparison, a feature-space scatter plot of the compensated power spectrum sensed from an unknown phenomenon and reference compensated power spectra sensed from known phenomena can be constructed (step 113).

In particular, a reference compensated power spectrum is generated in response to each of a variety of dangerous fire and/or false alarm situations. These tests can be divided into four different categories: ambient environment tests, such as, e.g., ambient firehouse background; false alarm source tests, such as, e.g., sunlight reflected off a rotating aluminum disc, sun off of bubbled water, arcwelding, a fixed or random chopper; dangerous fire source tests, such as, e.g., propane fire, IPA, and heptane; and dangerous fire/false alarm combination tests, using any combination of the above-mentioned dangerous fire and false alarm sources, including combinations utilizing direct and indirect sun. Preferably, the reference compensated power spectra are generated over an extended period of time, such as, e.g., 30 seconds, so that an accurate profile can be obtained from each test.

After the reference compensated power spectra for the respective test sources are obtained, the respective average amplitudes and centroids of the reference compensated power spectra are determined and respectively combined into feature space coordinates, i.e., amplitude-centroid coordinates. The feature space coordinates are then plotted on a semi-logarithmic feature space scatter plot, as exemplified in FIG. 16. Unwanted fire source coordinates, i.e., feature space coordinates that were obtained from tests performed during dangerous fire source and dangerous fire/false alarm situations, are represented as circles, and false alarm coordinates, i.e., feature space coordinates that were obtained from tests performed in strictly ambient environment and false alarm situations, are represented by solid dots. As can be seen, the unwanted dangerous fire source coordinates are concentrated toward the upper left of the space, and the false alarm source coordinates are concentrated toward the lower right of the space.

The unwanted dangerous fire source coordinates can be isolated from the false alarm source coordinated by plotting a fire detection boundary 101 (represented by the solid line) on the feature space scatter plot. The fire detection boundary 101 is defined, such that substantially all or substantially all of the false alarm source coordinates are excluded. The fire detection boundary 101 exemplified in the feature space scatter plot of FIG. 16, for example, consists of three linear segments with the following end points for each segment:

segment A: $\overline{(0,7000)(3.9,7000)}$ segment B: $\overline{(3.9,7000)(8.5,40000)}$ segment C: $\overline{(8.5,40000)(8.5,10000000)}$ The fire detection boundary 101 is stored in memory for later use in determining whether a particular unknown phenomenon poses a fire danger.

In particular, when monitoring the unknown phenomenon, the average amplitude and centroid of a compensated power spectrum generated from the sensed energy is obtained and plotted on the feature space scatter plot as a subject feature space coordinate (step 114). The location of the subject feature space coordinate is then determined with respect to the fire detection boundary 101 (step 120). Inclusion of the subject feature space coordinate inside the fire detection boundary 101 is indicative of the presence of an unwanted fire, in which case, a fire situation or at least a possible fire situation, is declared (step 124).

Alternatively, after the fire situation is declared, further sensory data is obtained and analyzed to confirm or deny the fire situation declaration (represented by the dashed line). Confirmation of a fire situation can be established by utilizing further fire detection techniques. Additional fire detection algorithms are disclosed in U.S. Pat. No. 6,064,064, previously incorporated by reference herein, and U.S. Prov. Appln. Ser. No. 60/151,189 filed Aug. 27, 1999, which is hereby incorporated by reference as if set forth fully herein.

Conversely, exclusion of the subject feature space coordinate outside the fire detection boundary 101 is indicative of the absence of an unwanted fire, in which case, a non-fire situation is declared (step 124), and further sensory data is obtained and analyzed.

Figure 16:
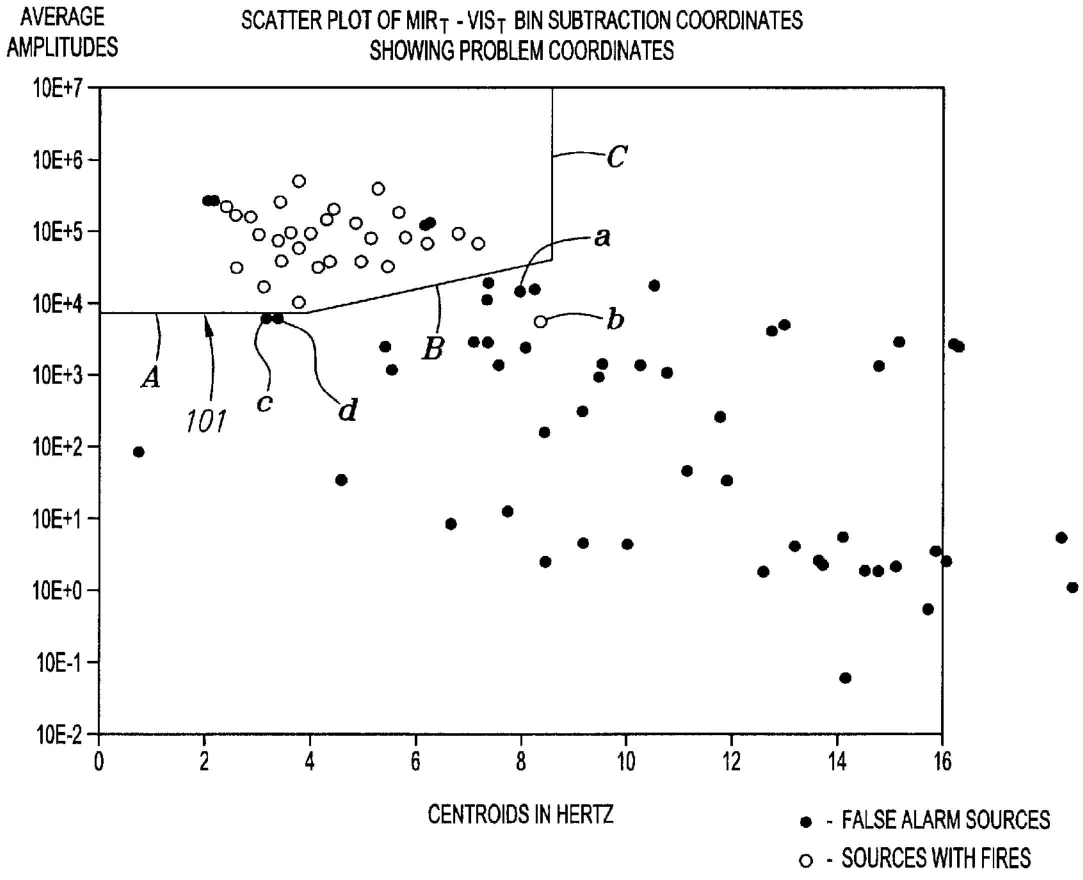
FIG. 16 is a feature space scatter plot of feature space coordinates constructed from reference compensated power spectra generating during a variety of known unwanted fires and known false alarms.

At times, the fire detection boundary 101, without further adjustment, may erroneously include false alarm source coordinates, or erroneously include unwanted fire source coordinates. For example, as illustrated in FIG. 16, there are two unwanted fire source coordinates, designated as respective coordinates a and b, that are excluded outside of the fire detection boundary 101, and two false alarm source coordinates, designated as respective coordinates c and d, that are excluded outside of but are close to the fire detection boundary 101.

Figure 18:
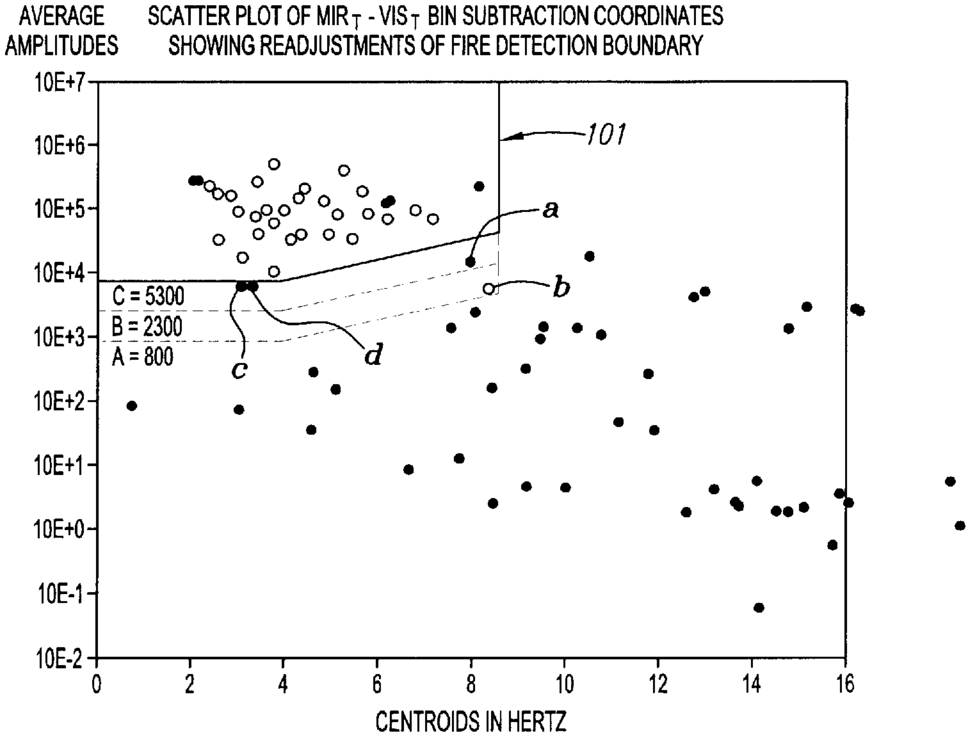
FIG. 18 is the feature space scatter plot of FIG. 16, wherein the fire detection boundary is adjusted in accordance with the linear regression line of FIG. 17.

To ensure that the fire detection boundary 101 includes, rather than excludes, unwanted fire source coordinates, or excludes, rather than includes, false alarm source coordinates, the fire detection boundary 101 can alternatively be dynamic (step 116). That is, the fire detection boundary 101 fluctuates in amplitude, as illustrated in FIG. 18, such that dangerous fire sources fall within the fire detection boundary 101 and false alarm sources fall outside the fire detection boundary 101.

Figure 17:
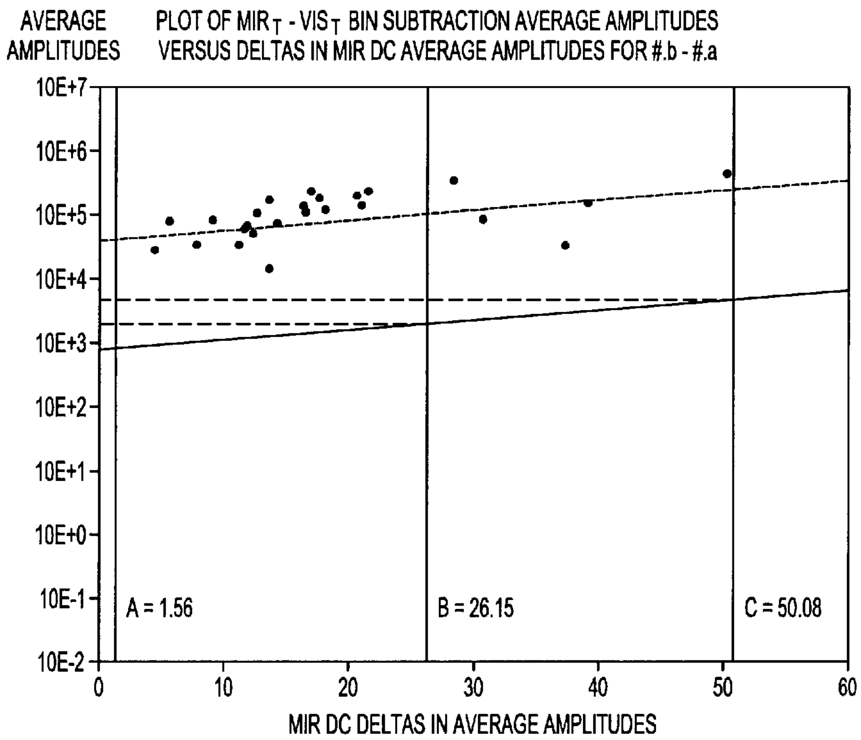
FIG. 17 is a linear regression line constructed from the average amplitudes of the reference compensated power spectra of FIG. 16 as a function of $NIR_{DC}$ average amplitude deltas.

The detection threshold of the fire detection boundary 101 can be adjusted based on data sensed by the NIR sensor 42 during monitoring of the phenomenon. In particular, the average amplitudes of the compensated power spectrum are examined as a function of NIR data. For instance, $NIR_{DC}$ deltas (i.e., the difference between the $NIR_{DC}$ data and a measured ambient background level) and the corresponding average amplitudes of the compensated power spectrum originating from unwanted fire and unwanted fire/false alarm combination tests can be used to generate data coordinates, which can be plotted on a semi-logarithmic plot as shown in FIG. 17. Like the MIR and VIS power spectra, each of the $NIR_{DC}$ delta values are averaged over an extended period of time, such as, e.g., 30 seconds.

A linear regression line in the form of the equation y=mx+b (shown by the dotted line in FIG. 17), where m represents the slope and b represents the intercept, can be utilized to adjust the fire detection boundary 101. Linear regression is a statistical technique for determining a straight line that best fits a set of two or more data pairs, providing a linear relationship between two variables, i.e., it provides a least squares fit to the data. Letting the variable x be a member of the set of $NIR_{DC}$ delta values, and the variable y be a member of the set of power spectrum average amplitudes $P_{AVG}$, the slope m and intercept b of the regression line y=mx+b are respectively calculated using the following equations:

$$m = \frac{n\sum xy - \sum x \sum y}{n\sum x^2 - (\sum x)^2},$$

$$b = \frac{\sum y \sum x^2 - \sum x \sum xy}{n\sum x^2 - (\sum x)^2},$$

where n is the number of data pairs. Preferably, when constructing the linear regression line, extraneous data coordinates that would otherwise obscure the data are ignored.

The linear regression line dictates the range of regression of the fire boundary line. In particular, three vertical lines, indicated as line A, line B and line C, are plotted on the linear regression plot, where line A represents the lowest regression line, i.e., the lowest detected $NIR_{DC}$ delta value, line C represents the highest regression line, i.e., the highest detected $NIR_{DC}$ delta value, and line B represents the regression line half-way between the respective lowest and highest regression lines. The linear regression line is translated downward (represented by the solid line), such that all unwanted fire source coordinates in the feature space scatter plot (shown in FIG. 16) are included inside the adjusted fire detection boundary 101.

The primary purpose of this technique is that for low $NIR_{DC}$ delta values (i.e., cooler fires), the detection threshold of the fire detection boundary 101 would be lowered, so that such dangerous fire sources fall within the fire detection boundary 101, and that as $NIR_{DC}$ delta values increase the fire detection boundary 101 would be raised, such that false alarm sources fall outside the fire detection boundary 101. In essence, the fire detection boundary 101 slides up or down as a function of the $NIR_{DC}$ delta values. FIG. 18 illustrates the feature space scatter plot with the fire detection boundary 101 shown translated from its highest regression to its lowest regression. When detecting whether a monitored phenomenon represents an unwanted fire, the fire detection boundary 101 is adjusted based on the $NIR_{DC}$ delta value measured from the energy emitted by the monitored phenomenon. Like the power spectra obtained from the $MIR_T$ and $VIS_T$ digital data, the $NIR_{DC}$ delta value represent a moving averaged delta value, i.e., a delta value that is generated periodically (e.g., every one-quarter second) and averaged over a time segment (e.g., one second) of the $NIR_{DC}$ digitized data.

In alternative embodiments, linear regression lines can be constructed from data points representing average power spectrum amplitudes $P_{AVG}$ as a function of $NIR_T$ maximum-minimum values, or from data points representing average power spectrum amplitudes $P_{AVG}$ as a function of RMS values of full-wave rectified $NIR_T$ signals.

During monitoring of an unknown phenomenon (i.e., when comparing the subject feature space-coordinate to the fire detection boundary 101 (step 120)), the $NIR_{DC}$ delta digital data, and alternatively, the $NIR_T$ max-min value or the RMS value of the full-wave rectified $NIR_T$ signal, is detected and obtained from the NIR sensor 42 (step 118). The fire detection boundary 101 is then accordingly adjusted, in accordance with the above-described calculations, to provide a more accurate comparison between the subject feature space coordinate and the dynamic fire detection boundary 101 (step 119).

As described above, both the average amplitude and the centroid of the compensated power spectrum generated from the sensed energy are obtained and plotted on the feature space scatter plot as a subject feature space coordinate against the respective average amplitudes and centroids of the reference compensated power spectra. Alternatively, either the average amplitude or the centroid of the subject compensated power spectrum can be compared to the respective average amplitudes or centroids of the reference compensated power spectra.

Figure 20:
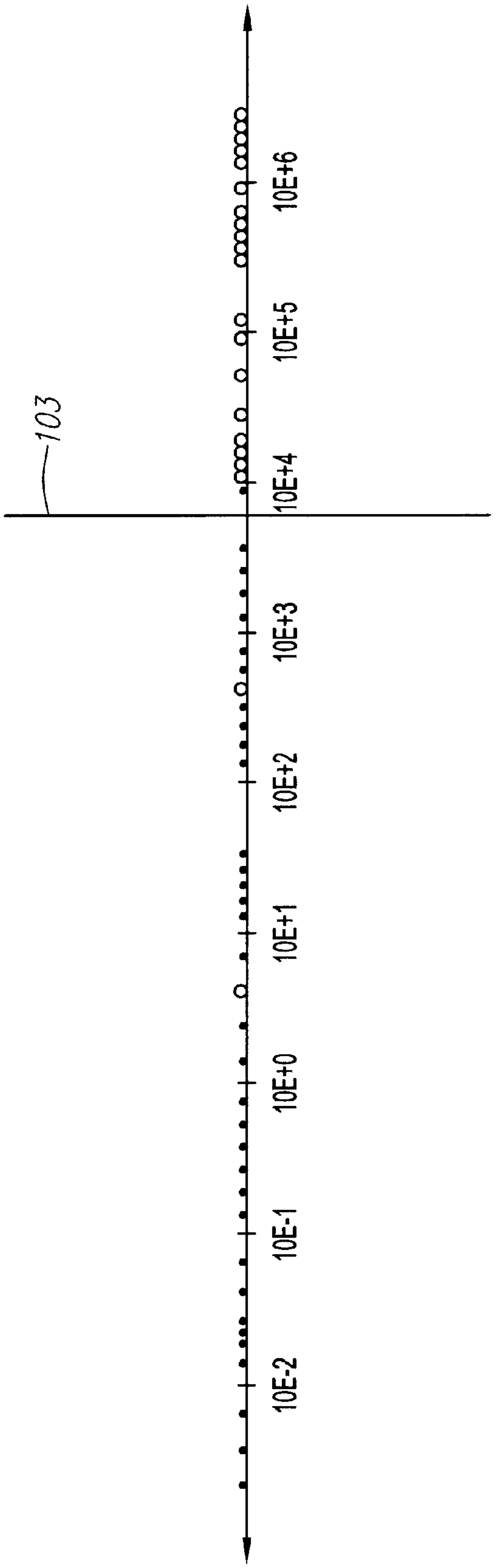
FIG. 20 is a plot of ordinates constructed from reference compensated power spectra generating during a variety of known unwanted fires and known false alarms.

For example, the average amplitude of the subject compensated power spectrum can be plotted on a logarithmic scale against the respective average amplitudes of the reference compensated power spectra, as illustrated in FIG. 20. Known unwanted fire source ordinates are represented as circles, and known false alarm ordinates are represented by solid dots. As can be seen, the unwanted dangerous fire source ordinates are concentrated toward the upper portion of the scale, while the false alarm ordinates are concentrated toward the bottom portion of the scale. A fire detection boundary 103 (represented by the solid line), which excludes substantially all or all of the false alarm source coordinates, is defined on the scatter plot. Thus, when monitoring an unknown phenomenon, the average amplitude of a compensated power spectrum generated from the sensed energy is obtained and plotted on the plot as a subject ordinate. Inclusion of the subject ordinate within the fire detection boundary (as shown in FIG. 20, to the right of the fire detection boundary 103) is indicative of the presence of an unwanted fire. Conversely, exclusion of the subject ordinate outside the fire detection boundary 103 (as shown in FIG. 20, to the left of the fire detection boundary 103) is indicative of the absence of an unwanted fire. As described above, the fire detection boundary can slide up or down as a function of the $NIR_{DC}$ delta values.

Although the above-described fire detection techniques have been described with respect to generating and analyzing a compensated power spectrum utilizing the MIR-VIS optical frequency band pair, other optical frequency band pairs can be employed. For example, the MIR sensor 44 can be utilized as the primary sensor, and the NIR sensor 42 as the secondary sensor to generate a compensated power spectrum based on an MIR-NIR optical frequency pair, which can then be subsequently analyzed to determine whether an unknown phenomenon poses a dangerous fire situation. Or the NIR sensor 42 can be utilized as the primary sensor, and the VIS sensor 40 as the secondary sensor to generate a compensated power spectrum based on an NIR-VIS optical frequency pair, which can then be subsequently analyzed to determine whether an unknown phenomenon poses a dangerous fire situation.

Referring back to FIG. 9, the declaration of the fire situation can be trifurcated into an "alert," a "fire early warning," or an "alarm" condition. The controller 39 selectively triggers one or more of three individual relays within an alarm unit 56 (one-, two-, or three-stage). In accordance with one embodiment, a three-stage version of the multi-stage alarm unit 56 comprises an "alert" relay 58, a "fire early warning" relay 60, and an "alarm" relay 62. Alternatively, in accordance with another embodiment, a two-stage version of the multi-stage alarm unit 56 comprises only the "alert" relay 58 and the "alarm" relay 62. Each of the relays may be coupled to distinctive LED indicators, audible alarms, or the like. A timer 64 is set in every instance to either reject false alarm situations or allow the flame or fire sufficient time to self-extinguish. The controller 39 may also initiate a multilevel response based upon both the type of fire and the radiant wide band continuous spectral output of the fire. Further details regarding the use of a multistage alarm system and a multilevel response system are disclosed in copending application Ser. No. 08/866,029, which was filed on May 30, 1997, and which has previously been incorporated herein as if set forth fully herein.

In accordance with another feature, the controller 36 and the controller 39 verify proper operation of each other, and upon detecting any sign of failure, trigger the fault relay 66.

In a preferred embodiment, a real-time graphical display of the digital sensor data detected by the flame detector 32 is generated and viewed at a "SnapShot™" display 68. The digital sensor data is represented in the form of relative spectral intensities versus present time. The "Snapshot" display is preferably viewed with an IBM compatible personal computer (with an RS-232 interface port). An associated memory (RAM) 68*a* may store a particular display.

A "FirePic™" generator 70 facilitates retrieval of sensor spectral data stored prior to an occurrence of fire. A graphical display of relative spectral intensities versus time preceding the fire provides evidence to enable analysis and determine the true cause of the fire. The "FirePic" data may be stored, for example, in a non-volatile RAM 72. As indicated in FIG. 18, the "FirePic" data may indicate a "FirePic" number and data such as the date, the time, the temperature, the $MIR_{(DC\ and\ T)}$, $NIR_{(DC\ and\ T)}$, and $VIS_{(DC\ and\ T)}$ readings of sensor signal data, the input voltage, and the control switch settings. Further details on the use of SnapShot™" display 68 and the "FirePic™" generator 70 are disclosed in U.S. Pat. No. 6,064,064, previously incorporated reference as if set forth fully herein.

The controller 39 initially and routinely after preselected periods of time, such as every ten minutes, performs diagnostic evaluation or tests on selected system components, such as checking for continuity through the relay coils, checking to ensure that the control settings are as desired, and so on. Upon detecting some cause for concern, the diagnostic test relating to the area of concern may be performed every thirty seconds or any such preselected period of time. It should be understood that any or all the parameters including reaction times, etc., may be programmed to address particular requirements. A digital serial communication circuit 69 (see FIGS. 9 and 10) controls serial connections of one or more of a plurality of flame detectors 32 to the controller 39 to ensure clear communication through the otherwise noisy environment. Further details on diagnostic testing of selected system components are disclosed in U.S. Pat. No. 6,064,064, previously incorporated by reference as if set forth fully herein.

Figure 12:
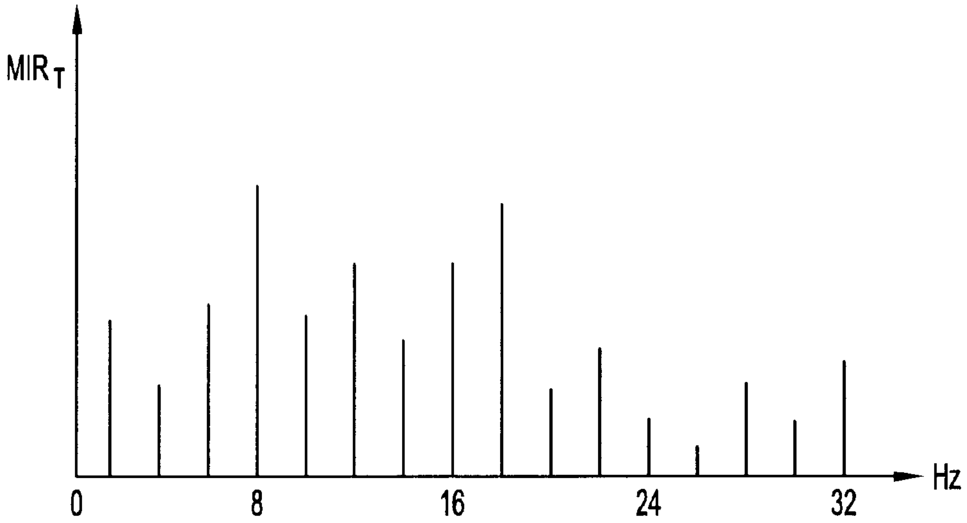
FIG. 12 is an exemplary graph of a power spectrum of frequency components generated from temporal radiant energy sensed in the MIR optical frequency range.
Figure 13:
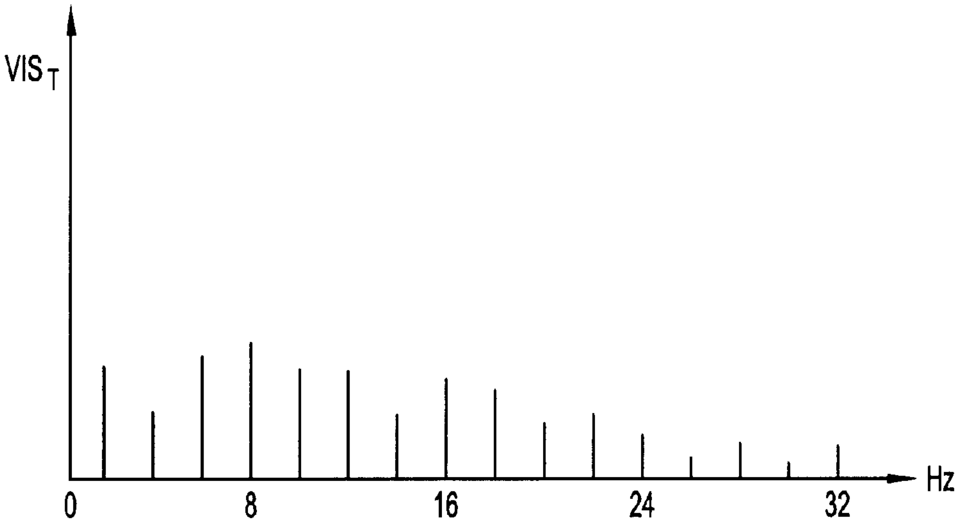
FIG. 13 is an exemplary graph of a power spectrum of frequency components generated from temporal radiant energy sensed in the VIS optical frequency range.

Referring now to FIG. 12, in accordance with an alternative embodiment of the present system, the controller 36 located within the flame detector 32 itself processes all the sensor digital data to determine the nature of the prevailing condition and triggers an appropriate one of the multistage (e.g., two- or three-stage) alarm unit 56. In this embodiment only the "SnapShot" display 68 and its associated memory 68*a* is located external to the detector component 32. The digital communication serial circuit 68 controls serial connections of one or more of a plurality of flame detectors 32 to any peripheral devices such as the printer 76, "SnapShot" display 60, etc.

While the present invention has been described in conjunction with specific embodiments thereof, many alternatives, modifications, and variations will be apparent to those skilled in the art in view of the foregoing description. Accordingly, the invention is intended to embrace all such alternatives, modifications, and variations that fall within the spirit and scope of any appended claims.

What is claimed is:

1. A flame detection system, comprising:

a plurality of sensors covering at least a wide band infrared spectrum;

a plurality of sensor signals output from said sensors; and a controller connected to said sensor signals, said controller configured to transform each of said sensor signals into a plurality constituent frequency components, to compare said constituent frequency components of said sensor signals, and to determine whether a potential fire exists based upon the comparison of said constituent frequency components, wherein said plurality of sensors comprise a wide band infrared sensor, a near band infrared sensor, and a visible band sensor, and wherein said plurality of sensor signals comprise a wide band infrared sensor signal, a near band infrared sensor signal, and a visible band sensor signal.

2. The flame detection system of claim 1, wherein said controller transforms each of said sensor signals into a plurality of frequency components at a set of discrete, predetermined frequencies.

3. The flame detection system of claim 1, wherein said controller generates an energy profile based upon a comparison of the constituent frequency components of said wide band infrared sensor signal and said near band infrared sensor signal, and a comparison of the constituent frequency components of said wide band infrared sensor signal and said visible band sensor signal.

4. The flame detection system of claim 3, wherein said controller determines whether a potential fire exists by matching said energy profile to known fire profiles.

5. A method for flame detection, comprising the steps of:

detecting radiant energy as a function of time over a plurality of frequency spectrums including at least a wide band infrared frequency spectrum, and generating a plurality of sensor signals thereby;

transforming each of said sensor signals into a plurality of constituent frequency components;

comparing said constituent frequency components of said sensor signals; and determining whether a potential fire exists based upon the comparison of said constituent frequency components, wherein said step of detecting radiant energy over said plurality of frequency spectrums comprises the step of detecting radiant energy over a wide band infrared frequency spectrum, a near band infrared frequency spectrum, and a visible band frequency spectrum, and wherein said plurality of sensor signals comprise a wide band infrared sensor signal, a near band infrared sensor signal, and a visible band sensor signal.

6. The method of claim 5, wherein said step of transforming each of said sensor signals into said plurality of constituent frequency components comprises the step of transforming each of said sensor signals into said plurality of constituent frequency components at a set of discrete, predetermined frequencies.

7. The method of claim 5, further comprising the step of generating an energy profile by comparing the constituent frequency components of said wide band infrared sensor signal and said near band infrared sensor signal, and comparing the constituent frequency components of said wide band infrared sensor signal and said visible band sensor signal.

8. The method of claim 7, wherein said step of determining whether a potential fire exists comprises the step of matching said energy profile to known fire profiles.

9. A method of detecting an unwanted fire situation, comprising the steps of:

(a) transforming temporal radiant energy sensed from an environment into a first spectrum of frequency components;

(b) transforming temporal radiant energy sensed from false-alarm sources into a second spectrum of frequency components;

(c) generating a compensated spectrum of frequency components based on a comparison between the respective first and second spectra of frequency components; and (d) detecting the unwanted fire situation based upon the compensated spectrum of frequency components.

10. The method of claim 9, wherein said step of generating said compensated spectrum of frequency components comprises the step of subtracting the second spectrum of frequency components from the first spectrum of frequency components.

11. The method of claim 10, further comprising the step of determining an average amplitude and a centroid of the compensated spectrum of frequency components, wherein said step of detecting the unwanted fire situation is based upon said average amplitude and said centroid.

12. The method of claim 9, further comprising the step of generating a reference profile for each of one or more known fires and false alarm sources by performing steps (a) through (c) during the respective one or more known fires and false alarm sources, wherein said step of detecting the unwanted fire situation comprises the step of comparing the compensated spectrum of frequency components with the reference profiles of the one or more known fires and false alarm sources.

13. The method of claim 12, wherein said step of generating a reference profile for each of one or more known fires comprises the step of generating a reference compensated spectra of frequency components for each of one or more known fires and false alarm sources by performing steps (a) through (c) during the respective one or more known fires and false alarm conditions, wherein said method further comprises the steps of determining an average amplitude and a centroid of the compensated spectrum of frequency components, and determining an average amplitude and a centroid of each of the reference compensated spectra of frequency components, wherein the step of detecting the unwanted fire situation comprises the step of respectively comparing the average amplitude and the centroid to the reference average amplitudes and reference centroids.

14. The method of claim 9, wherein the temporal radiant energy from the environment and the temporal radiant energy from the non-fire sources are respectively sensed in an optical frequency range pair comprising one of a (wide band infrared, visible) frequency range pair, (wide band infrared, near band infrared) frequency range pair, and (near band infrared, visible band) frequency range pair.

15. The method of claim 9, wherein the temporal radiant energy from the environment is sensed in a wide band infrared frequency range and the temporal radiant energy from the non-fire sources is sensed in the visible band frequency range.

16. The method of claim 9, wherein the temporal energy from the environment and the temporal energy from the non-fire source are sensed simultaneously.

* * * * *